US011402305B2

(12) United States Patent
Nagai et al.

(10) Patent No.: US 11,402,305 B2
(45) Date of Patent: Aug. 2, 2022

(54) SMEAR STAINING APPARATUS, SMEAR PREPARING APPARATUS, AND SMEAR STAINING METHOD

(71) Applicant: SYSMEX CORPORATION, Kobe (JP)

(72) Inventors: Takaaki Nagai, Kobe (JP); Noriyuki Nakanishi, Kobe (JP); Seiya Shinabe, Kobe (JP); Tetsuya Oda, Kobe (JP); Mitsuo Yamasaki, Kobe (JP); Hiroyuki Koga, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 463 days.

(21) Appl. No.: 16/047,520

(22) Filed: Jul. 27, 2018

(65) Prior Publication Data
US 2018/0356319 A1 Dec. 13, 2018

Related U.S. Application Data

(63) Continuation of application No. PCT/JP2017/001374, filed on Jan. 17, 2017.

(30) Foreign Application Priority Data

Jan. 29, 2016 (JP) .............................. JP2016-016490

(51) Int. Cl.
G01N 1/00 (2006.01)
G01N 1/31 (2006.01)
(Continued)

(52) U.S. Cl.
CPC ........... *G01N 1/312* (2013.01); *G01N 1/2813* (2013.01); *G01N 1/30* (2013.01); *G01N 2035/00138* (2013.01)

(58) Field of Classification Search
None
See application file for complete search history.

(56) References Cited

U.S. PATENT DOCUMENTS 3,352,280 A 11/1967 Hughes et al.
5,078,969 A 1/1992 Bacus
(Continued)

FOREIGN PATENT DOCUMENTS

CN 1271854 A 11/2000
CN 201218787 Y 4/2009
(Continued)

OTHER PUBLICATIONS

Extended European search report dated Jan. 13, 2020 in a counterpart European patent application.
(Continued)

*Primary Examiner* — Jyoti Nagpaul
(74) *Attorney, Agent, or Firm* — Metrolex IP Law Group, PLLC

(57) ABSTRACT

A smear staining apparatus may include: a chamber part in which glass slides can be placed and that is configured to contain a staining solution for staining a smear on each of the glass slides; a cover part that covers the chamber part from above and comprises an insertion hole through which the glass slides are transported to the chamber part; and a transport part that transports the glass slides to the chamber part through the insertion hole.

19 Claims, 13 Drawing Sheets

(51) Int. Cl.
  *G01N 1/30* (2006.01)
  *G01N 1/28* (2006.01)
  *G01N 35/00* (2006.01)

(56) References Cited

U.S. PATENT DOCUMENTS

| | | |
|---|---|---|
| 5,776,414 A | 7/1998 | Itani et al. |
| 5,830,413 A | 11/1998 | Lang et al. |
| 6,319,470 B1 | 11/2001 | Lefevre et al. |
| 6,635,225 B1 | 10/2003 | Thiem et al. |
| 7,883,667 B2 * | 2/2011 | Shah .................. G01N 1/312 422/65 |
| 2004/0033169 A1 | 2/2004 | Shah |
| 2006/0188405 A1 | 8/2006 | Shah |
| 2010/0144018 A1 | 6/2010 | Shah et al. |
| 2011/0061588 A1 | 3/2011 | Truchaud |
| 2011/0136135 A1 | 6/2011 | Larsen et al. |
| 2012/0138499 A1 | 6/2012 | Berberich et al. |
| 2012/0276583 A1 | 11/2012 | Visinoni et al. |
| 2014/0051118 A1 | 2/2014 | Matthiesen et al. |

FOREIGN PATENT DOCUMENTS

| | | |
|---|---|---|
| CN | 102768142 A | 11/2012 |
| CN | 204594776 U | 8/2015 |
| DE | 19933153 A1 | 2/2001 |
| EP | 0433029 A1 | 6/1991 |
| JP | S59-154633 U | 10/1984 |
| JP | H03-70355 U | 7/1991 |
| JP | H03-50972 B2 | 8/1991 |
| JP | H04-27380 A | 1/1992 |
| JP | H04-291157 A | 10/1992 |
| JP | H08-261896 A | 10/1996 |
| JP | H08-304412 A | 11/1996 |
| JP | H09-43119 A | 2/1997 |
| JP | 2000-074803 A | 3/2000 |
| JP | 2002-071538 A | 3/2002 |
| JP | 2009-525482 A | 7/2009 |
| JP | 2014-523514 A | 9/2014 |
| JP | 2016-099326 A | 5/2016 |

OTHER PUBLICATIONS

Communication pursuant to Rule 164(1) dated Sep. 12, 2019 in a counterpart European patent application.
Office Action dated Apr. 8, 2020 in a counterpart Chinese patent application.
Office Action dated Apr. 25, 2021 in a counterpart Chinese patent application.
Office Action (CNOA) dated Nov. 15, 2021 in a counterpart Chinese patent application.
Office Action (CNOA) dated Mar. 3, 2022 in a counterpart Chinese patent application.
Communication pursuant to Article 94(3) dated May 12, 2022 in a counterpart European patent application.

* cited by examiner

SECTION ALONG 800-800

FIG. 12A

SUPPLY CHAMBERS WITH STAINING SOLUTIONS
WHEN DESIGNATED ELAPSED TIME OR NUMBER OF GLASSES PREPARED IS MET

| UNDILUTED SOLUTION | DILUTED SOLUTION |

ELAPSED TIME

1:00 — +

NUMBER OF GLASSES PREPARED

30 — +

OK  CANCEL

FIG. 12B

SUPPLY CHAMBERS WITH STAINING SOLUTIONS
WHEN DESIGNATED ELAPSED TIME IS MET

| UNDILUTED SOLUTION | DILUTED SOLUTION |

ELAPSED TIME

0:30 — +

OK  CANCEL

FIG. 13

| | DOUBLE STAINING MAY-GIEMSA | DOUBLE STAINING WRIGHT-GIEMSA | SINGLE STAINING WRIGHT |
|---|---|---|---|
| CLEANING CHAMBER 40b | PURE WATER | PURE WATER | PURE WATER |
| STAINING CHAMBER 20e | GIEMSA (DILUTED) | GIEMSA (DILUTED) | WRIGHT (DILUTED) |
| STAINING CHAMBER 20d | GIEMSA (DILUTED) | GIEMSA (DILUTED) | WRIGHT (DILUTED) |
| CLEANING CHAMBER 40a | PHOSPHATE BUFFER | PHOSPHATE BUFFER | |
| STAINING CHAMBER 20c | MAY (DILUTED) | WRIGHT (DILUTED) | WRIGHT (DILUTED) |
| STAINING CHAMBER 20b | MAY (UNDILUTED) | WRIGHT (UNDILUTED) | WRIGHT (UNDILUTED) |
| STAINING CHAMBER 20a | METHANOL | METHANOL | METHANOL |

 DILUTED STAINING SOLUTION GROUP

 UNDILUTED SOLUTION GROUP

SMEAR STAINING APPARATUS, SMEAR PREPARING APPARATUS, AND SMEAR STAINING METHOD

CROSS REFERENCE TO RELATED APPLICATIONS

This application is a continuation application of International Application No. PCT/JP2017/001374, filed on Jan. 17, 2017, which claims priority based on the Article 8 of Patent Cooperation Treaty from prior Japanese Patent Application No. 2016-016490, filed on Jan. 29, 2016, the entire contents of which are incorporated herein by reference.

BACKGROUND

The disclosure relates to a smear staining apparatus, a smear preparing apparatus, and a smear staining method.

US Patent Application Publication No. 2010/0144018 (Patent Literature 1) discloses a smear staining apparatus that stains a smear on a glass slide. In the slide staining apparatus in Patent Literature 1, staining chambers to be filled with staining solutions are arranged side by side. A glass slide is inserted into each staining chamber from above.

When a plurality of glass slides is set in the staining chamber, the liquid surface level of the staining solution in the staining chamber changes vertically depending on the number of the glass slides set. Due to the change of the liquid surface level, smear staining regions on the glass slides may not be immersed in the staining solution sufficiently, or print regions on the glass slides may come into contact with the staining solution and be soiled. To avoid such situations, the staining chamber needs to be configured so that the area of the liquid surface is sufficiently larger than the areas of the horizontal sections of the glass slides so as to reduce the range of change in the liquid surface.

Meanwhile, a staining solution for staining smears often contains a volatile component such as an organic solvent. For this reason, the staining solution easily evaporates when the area of the liquid surface is large. Thus, there are demands that the amount of staining solution in the staining chamber be maintained while the area of the liquid surface of the staining solution is sufficiently large.

SUMMARY

A smear staining apparatus according to a first aspect may include: a chamber part in which glass slides can be placed and that is configured to contain a staining solution for staining a smear on each of the glass slides; a cover part that covers the chamber part from above and comprises an insertion hole through which the glass slides are transported to the chamber part; and a transport part that transports the glass slides to the chamber part through the insertion hole.

A smear staining apparatus according to a second aspect may include: a chamber part in which glass slides can be placed and that is configured to contain a staining solution for staining a smear on each of the glass slides; a fluid mechanism that supplies the chamber part with the staining solution; and a controller that causes the fluid mechanism to supply the chamber part in which the glass slides are placed, with the staining solution.

A smear preparing apparatus according to a third aspect comprises: a smearing unit that smears glass slides with samples; and a staining unit that includes the smear staining apparatus according to the first or second aspect.

A smear staining method according to a fourth aspect may include: filling a chamber part in which glass slides can be placed with a staining solution for staining a smear on each of the glass slides; and supplying the chamber part in which the glass slides are placed, with the staining solution.

One or more aspects may maintain the amount of staining solution in a staining chamber in the smear staining apparatus.

BRIEF DESCRIPTION OF DRAWINGS

FIG. 12A and FIG. 12B are diagrams each illustrating an example of a screen used to set timing for replenishment with a staining solution.

FIG. 13 is a diagram illustrating example usages of chamber parts.

DETAILED DESCRIPTION

An embodiment is described below using the drawings.

[Outline of the Smear Staining Apparatus]

Figure 1:
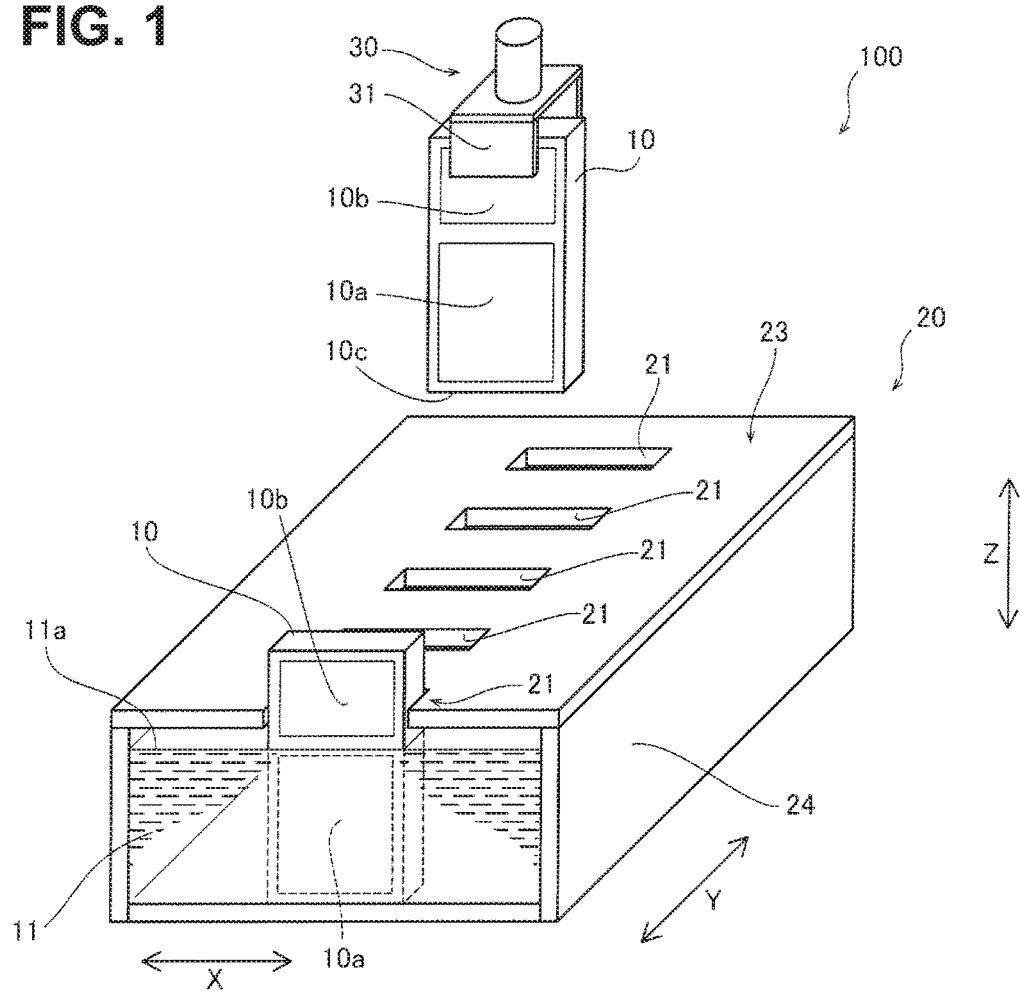
FIG. 1 is a schematic diagram illustrating an outline of a smear staining apparatus according to an embodiment.

With reference to FIG. 1, a description is given of an outline of a smear staining apparatus 100 according to an embodiment.

The smear staining apparatus 100 is an apparatus that performs smear staining processing on a glass slide 10 with a smear. In other words, the smear staining apparatus 100 stains the smear that is smeared on the glass slide 10. The smear is a biological specimen collected from a subject (a tested subject), and is, for example, blood, cells, or the like.

As illustrated in FIG. 1, the smear staining apparatus 100 includes: a cover part 23 with insertion holes 21; and a chamber part 24. The smear staining apparatus 100 also includes a transport part 30. In the example configuration in FIG. 1, the chamber part 24 and the cover part 23 together constitute part or all of a staining chamber 20 for performing staining processing.

The chamber part 24 is formed in the shape of a container capable of accommodating liquid. In other words, the chamber part 24 is configured to contain liquid. A plurality of glass slides can be placed in the chamber part 24, and the chamber part 24 is filled with a staining solution 11 for staining a smear on the glass slide 10.

Various types of the staining solution 11 are used for the respective steps in the staining processing. The staining solution 11 may contain a volatile organic solvent, such as methanol, ethanol, or xylene, as a main component. The organic solvent is used for processing to fixate or fix a smear applied to the glass slide 10. The fixation processing or fixing processing is performed to prevent cells in a smear from changing in properties due to disintegration, decay, or the like. The staining processing is carried out by immersing the glass slide 10 in the staining solution 11 in the chamber part 24 for a predetermined period of time.

The glass slide 10 is, for example, a rectangular, plate-shaped member. The glass slide 10 includes, for example, a stain section 10a where a smear is placed, and a print section 10b where various pieces of information, such as sample information, are presented. The stain section 10a is formed over a predetermined range extending in the longitudinal direction including the center portion in the longitudinal direction. The print section 10b is formed in one end portion of the glass slide 10 in the longitudinal direction, at a distance from the stain section 10a. For example, the print section 10b is a portion where the side glass is coated with a resin material or the like to make printing thereon possible. Printable on the print section 10b are a sample number, a date, a barcode or a two dimensional barcode, and the like.

In the staining processing, the entire stain section 10a needs to be in contact with the staining solution 11 sufficiently. On the other hand, if the print section 10b comes into contact with the staining solution 11, the print section 10b gets soiled, making the print hard to read. Thus, it is preferable that the liquid surface 11a of the staining solution 11 be maintained between the stain section 10a and the print section 10b.

On the other hand, in the staining chamber 20 in which a plurality of glass slides 10 can be set, the level of liquid surface 11a changes vertically (in the Z direction) depending on the number of glass slides 10 set in the chamber part 24. When the range of change in the liquid surface level is large, it is difficult to maintain the liquid surface 11a between the stain section 10a and the print section 10b. To reduce the range of change in the liquid surface 11a, the chamber part 24 is formed so that the area of a horizontal section of the staining solution 11 at least at the liquid surface level in the internal space (i.e., the area of the liquid surface 11a) is sufficiently larger than the areas of the horizontal sections of the glass slides 10 placed in the chamber part 24.

The larger the area of the liquid surface 11a is, the more the staining solution 11 containing an organic solvent evaporates. Thus, the smear staining apparatus 100 of an embodiment includes the cover part 23. The cover part 23 includes the insertion holes 21 through which the glass slides 10 are inserted or transported, and the cover part 23 covers the chamber part 24 from above. Specifically, the cover part 23 is disposed at a position higher than or above the liquid surface 11a of the staining solution 11 in the chamber part 24. Since the vapor of the staining solution 11 is likely to be held inside the space covered by the cover part 23, evaporation of the volatile staining solution 11 is reduced accordingly. The cover part 23 may be provided integrally with the chamber part 24, or the cover part 23 may be provided separately from the chamber part 24.

In the example in FIG. 1, the cover part 23 extends from the end portions of the chamber part 24 toward the insertion holes 21 in the width direction (the X direction) of the glass slide 10 placed in the chamber part 24. Thus, in FIG. 1, the cover part 23 covers all the region of the chamber part 24 except for the insertion holes 21. The cover part 23 may partially cover the region above the chamber part 24 except for the insertion holes 21. Even if the region except for the insertion holes 21 is not completely covered, the effect of reducing evaporation of the staining solution 11 can be achieved by the part covered by the cover part 23. From the perspective of reducing evaporation of the staining solution 11, it is preferable that the cover part 23 cover substantially the entire open region of the chamber part 24 except for the insertion holes 21.

The glass slide 10 is inserted into or transported to the chamber part 24 from above the chamber part 24 through one of the insertion holes 21. In the example configuration in FIG. 1, a plurality of insertion holes 21 are provided in the cover part 23, each insertion hole 21 is a slit through which a single glass slide 10 can be inserted. With these insertion holes 21, a plurality of glass slides 10 can be received by the chamber part 24 and stained collectively in the staining solution 11. In this case, the opening area of each insertion hole 21 is substantially the same as or slightly larger than the area of a horizontal section of the glass slide 10. In FIG. 1, each insertion hole 21 is formed in a size such that only a single glass slide 10 can be inserted therethrough at once.

Figure 2:
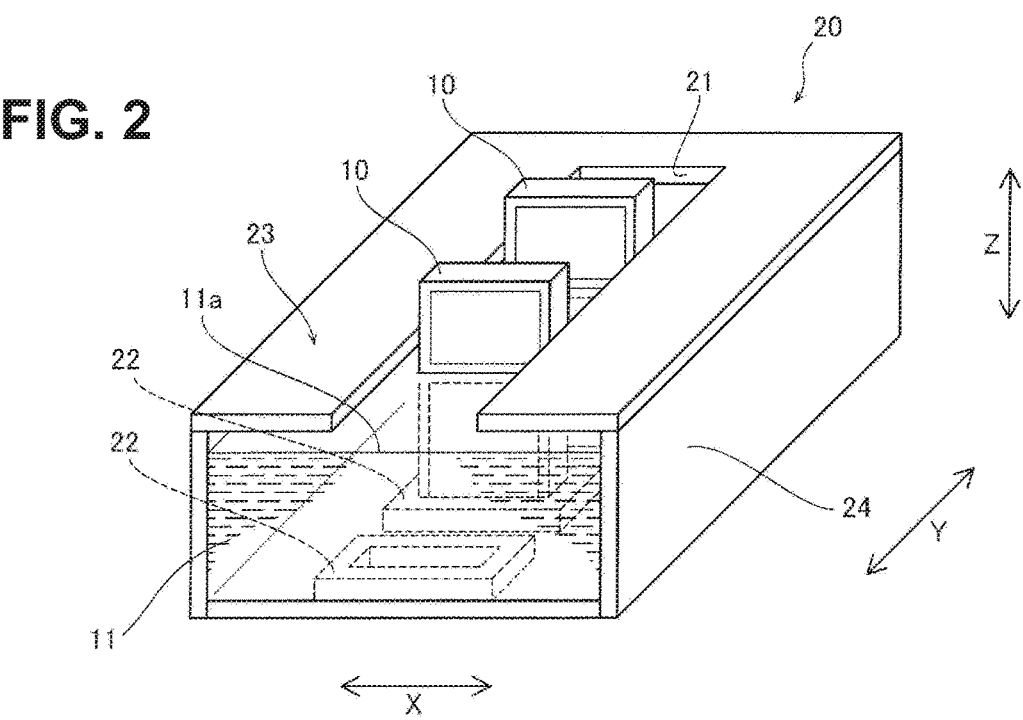
FIG. 2 is a schematic diagram illustrating another example configuration of a chamber part and a cover part in a smear staining apparatus.

The insertion hole 21 may be configured so that two or more glass slides 10 can be inserted through the common insertion hole 21. FIG. 2 illustrates an example configuration having the insertion hole 21 of a different opening shape. In FIG. 2, the insertion hole 21 is an opening extending in the direction in which a plurality of glass slides 10 are arranged in the chamber part 24, and is configured so that a plurality of glass slides 10 can be inserted therethrough. Like in FIG. 1, such an insertion hole 21 also allows a plurality of glass slides 10 to be received by the chamber part 24 and collectively stained in the staining solution 11. In FIG. 2, the insertion hole 21 extends in the Y direction, and the glass slides 10 inserted through the insertion hole 21 are arranged in the Y direction. In this case, the opening area of the insertion hole 21 is equal to or larger than the total area of horizontal sections of the glass slides 10.

For example, each glass slide 10 is held not to move in the chamber part 24. In the example configuration in FIG. 2, the chamber part 24 includes slide holders 22 to hold the glass slides 10 immersed in the staining solution 11. When the insertion hole 21 is a large opening as illustrated in FIG. 2, the glass slides 10 can be stably held by the slide holders 22 provided in the chamber part 24. The example configuration in FIG. 1 may be provided with the slide holders 22, such as in FIG. 2. Note that the slide holders 22 do not necessarily have to be provided.

In FIG. 2, the slide holders 22 are formed on the bottom portion of the chamber part 24. Each slide holder 22 includes a portion, such as a recess portion and a wall portion, to support the periphery of a lower end portion 10c of the glass slide 10. The slide holder 22 may be columnar and configured to support the side surfaces of the glass slide 10. The slide holder 22 may have a shape other than that illustrated in FIG. 2. The slide holders 22 may be provided in the cover part 23. The slide holders 22 may be provided in both the cover part 23 and the chamber part 24.

In FIG. 2, the slide holders 22 are configured to hold the respective glass slides 10 at holding positions arranged in a predetermined direction. The insertion hole 21 is an opening extending in a direction in which the glass slides 10 are arranged and is configured so that the glass slides 10 can be inserted or transported therethrough to the respective holding positions. Thereby, samples smeared on the glass slides 10 can be immersed in the staining solution 11 sufficiently.

Although FIG. 1 illustrates an example where five insertion holes 21 are formed to be able to hold five glass slides 10, the number of glass slides 10 that the slide holders 22 can hold is not limited to five as long as it is more than one. The same applies to FIG. 2.

The transport part 30 is capable of holding and transporting the glass slide 10. In the example configuration in FIG. 1, the transport part 30 is configured to hold and transport a single glass slide 10 and move the glass slide 10 in and out through the insertion hole 21. Specifically, the transport part 30 can move one glass slide 10 in and out of the insertion holes 21 from above the chamber part 24 at a time. If a plurality of glass slides 10 are transported at once, staining processing cannot be started until all the smeared glass slides are ready for the processing. By contrast, the configuration in which the transport part 30 transports one glass slide 10 at a time can shorten the time required for performing the staining processing on each glass slide 10.

Various configurations are employable for the transport part 30. For example, in the example configuration in FIG. 1, the transport part 30 is a three-axis cartesian robot that can move horizontally and vertically (Z direction) and that includes a hand 31 to grip the glass slide 10. Alternatively, the transport part 30 may be movable in one of the horizontal direction and the vertical direction, and the staining chamber 20 may be movable in the other one of the horizontal direction and the vertical direction. The hand 31 may be, for example, an open-and-close mechanism capable of gripping the glass slide 10 by sandwiching the glass slide 10, or a suction mechanism that grips the glass slide 10 by sucking a predetermined portion of the glass slide 10. The transport part 30 may be configured to be able to transport two or more glass slides 10 at once.

The smear staining apparatus 100 configured as described above can reduce evaporation of the volatile staining solution 11 with the cover part 23, even though the chamber part 24 is formed so that the area of the liquid surface 11a of the staining solution 11 may be sufficiently large. As a result, the amount of the staining solution 11 used can be reduced. Further, even though the cover part 23 is provided, the insertion hole(s) 21 can be left open. Thus, the smear staining apparatus 100 can be operated with the cover part 23 fixed, without requiring the cover part 23 to be removed to open the insertion hole(s) during the operation of the smear staining apparatus 100 or to be configured to be able to open and close. Thus, even though the cover part 23 is provided with or in the chamber part 24, the apparatus configuration and operation of the smear staining apparatus 100 can be simplified.

[Example Configuration of the Smear Preparing Apparatus]

Figure 3:
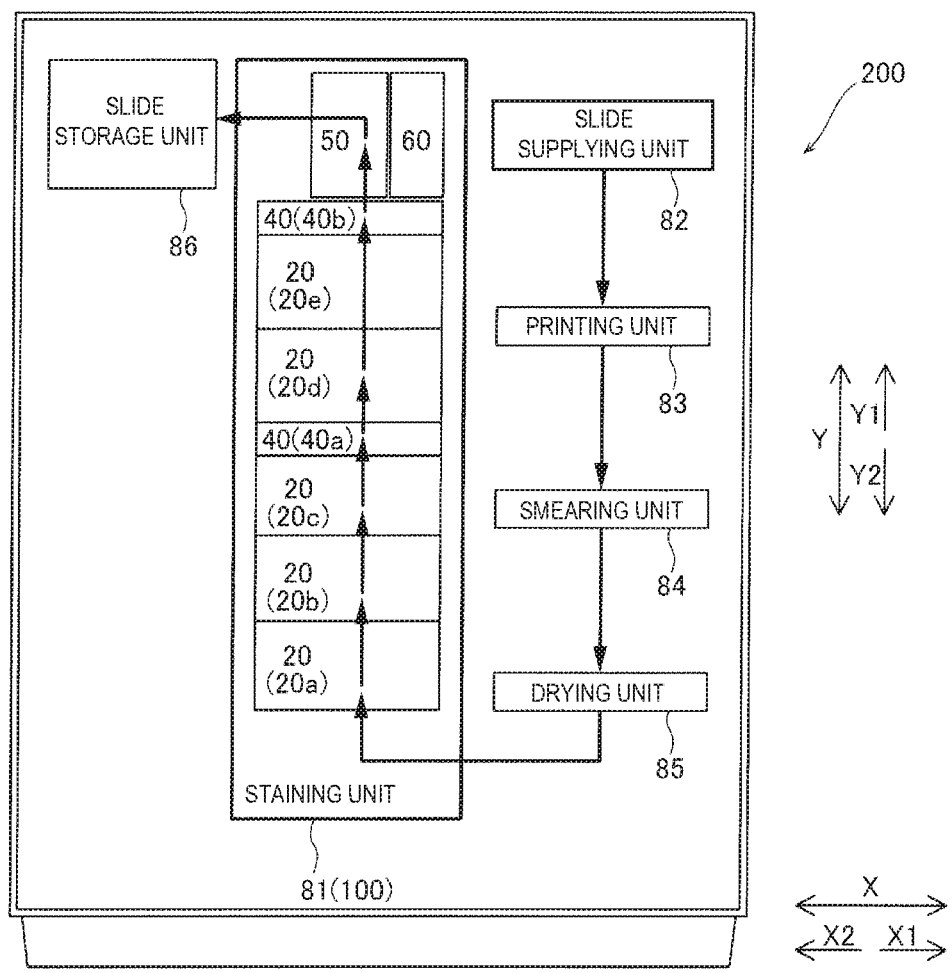
FIG. 3 is a schematic plan view illustrating an example overall configuration of a smear preparing apparatus.

With reference to FIG. 3 and so on, a description is given of an example configuration where the smear staining apparatus 100 illustrated in FIG. 1 is applied to a staining unit of a smear preparing apparatus 200. The smear preparing apparatus 200 is an apparatus that performs smearing processing to smear a sample on the glass slide 10 and then performs staining processing to stain the sample on the glass slide 10. The sample is, for example, blood.

(Overall Configuration)

The overall configuration of the smear preparing apparatus 200 is described with reference to FIG. 3.

In the example configuration in FIG. 3, the smear staining apparatus 100 including the staining chamber 20 illustrated in FIG. 1 or 2 and the transport part 30 is provided in a staining unit 81 of the smear preparing apparatus 200. In the example configuration in FIG. 3, the smear preparing apparatus 200 further includes a slide supplying unit 82, a printing unit 83, a smearing unit 84, a drying unit 85, and a slide storage unit 86.

The slide supplying unit 82 is configured to house a large number of unused glass slides 10 yet to be smeared with a sample. The slide supplying unit 82 can supply the printing unit 83 with the unsmeared glass slides 10 one at a time.

The printing unit 83 can print various pieces of information such as sample information on the print section 10b (see FIG. 8) of the glass slide 10. The printing unit 83 can transport the printed glass slide 10 to the smearing unit 84.

The smearing unit 84 can aspirate a sample using a sample aspiration mechanism (not shown) and smear the sample on the stain section 10a of the glass slide 10 (see FIG. 8) sent from the printing unit 83. The smearing unit 84 can transport the glass slide 10 having undergone the smearing processing to the drying unit 85.

The drying unit 85 has a function to receive the sample-smeared glass slide 10 from the smearing unit 84 and dry the stain section 10a.

The staining unit 81 performs staining processing by the smear staining apparatus 100 on the sample on the glass slide 10 having undergone the smearing processing by the smearing unit 84. In the staining unit 81, the smeared glass slide 10 dried by the drying unit 85 undergoes staining processing in each staining chamber 20 and cleaning processing in each cleaning chamber 40. The staining processing is completed with a drying step in a drying chamber 50, and the stained glass slide 10 is sent to the slide storage unit 86. The transport part 30 (see FIG. 1) performs transport of the glass slide 10 between members in the staining unit 81 and transport of the glass slide 10 to the slide storage unit 86.

The slide storage unit 86 has a function to store the stained glass slide 10.

Thus configured, the smear preparing apparatus 200 can automatically prepare a smear by subjecting the glass slide 10 to printing processing, sample smearing processing, and staining processing.

(Configuration of Staining Unit)

Next, an example configuration of the staining unit 81 is described with reference to FIG. 4. In the example configuration illustrated in FIG. 4, the staining unit 81 includes the staining chambers 20, the transport part 30, the cleaning chambers 40, the drying chamber 50, and an air blowing unit 60. The transport part 30 includes a first transport part 30a and a second transport part 30b. The smear preparing apparatus 200 includes a fluid circuit part 70 for supplying the staining solution 11 and a cleaning liquid 12 to the staining chambers 20 and the cleaning chambers 40, respectively and for discharging the staining solution 11 and the cleaning liquid 12 from the staining chambers 20 and the cleaning chambers 40, respectively. The smear preparing apparatus 200 includes a controller 71 that controls elements such as the transport part 30 and the air blowing unit 60. The controller 71 may be a computer including components, such as a CPU (Central Processing Unit) 711, a memory part 712, such as memory, and a clock part 713. The clock part 713 is, for example, one that can acquire time information, such as a system clock managed by the operation system of the controller 71 or a real-time clock in the controller 71.

Note that in the following, the X direction is the width direction of the glass slide 10 inserted in the staining chamber 20 (i.e., the width direction of the insertion hole 21), and the Y direction is the direction in which the glass slides 10 are arranged in the staining chamber 20 (i.e., the thickness direction of the insertion hole 21). In addition, the Z direction is the vertical direction, which is the direction in which the glass slide 10 is inserted.

The first transport part 30a and the second transport part 30b are disposed above (i.e., on the Z1 side of) the staining chambers 20 and the cleaning chambers 40. Moving mechanisms 32 enable the first transport part 30a and the second transport part 30b to move in horizontal directions (i.e., the X direction and the Y direction). Each moving mechanism 32 includes a Y-axis motor 33 and an X-axis motor 34 and moves the first transport part 30a or the second transport part 30b in horizontal directions.

The first transport part 30a and the second transport part 30b substantially have the same configuration. The first transport part 30a and the second transport part 30b each include a Z-axis motor 35 to raise and lower the hand 31.

The hand 31 can grip one glass slide 10. FIG. 4 illustrates an example where a pair of hands 31 sandwich and grip the respective glass slides 10 in their thickness direction. The hand 31 may be configured to sandwich and grip the glass slide 10 in its width direction.

The first transport part 30a can move above the positions of the staining and cleaning chambers on the Y2 side, namely, a first staining chamber 20a, a second staining chamber 20b, a third staining chamber 20c, and a first cleaning chamber 40a. The second transport part 30b can move above the positions of the staining and cleaning chambers on the Y1 side, namely, a second cleaning chamber 40b, a fifth staining chamber 20e, a fourth staining chamber 20d, and a first cleaning chamber 40a, as well as above the position of the drying chamber 50 and the transport path to the slide storage unit 86 (see FIG. 3).

The first transport part 30a and the second transport part 30b can transport different glass slides 10 at the same time. The operation ranges of the first transport part 30a and the second transport part 30b overlap at the first cleaning chamber 40a. At the first cleaning chamber 40a, the glass slide 10 is passed between the first transport part 30a and the second transport part 30b. The glass slide 10 may be passed at a position other than the first cleaning chamber 40a.

The cleaning chamber 40 can be filled with the cleaning liquid 12 to immerse the glass slide 10 therein. In FIG. 4, the cleaning chamber 40 has the same configuration as the staining chamber 20. In the cleaning chamber 40, the glass slide 10 undergoes cleaning processing by being immersed in the cleaning liquid 12 in the cleaning chamber 40. The cleaning processing is performed between steps of the staining processing and after all the steps of the staining processing.

Figure 4:
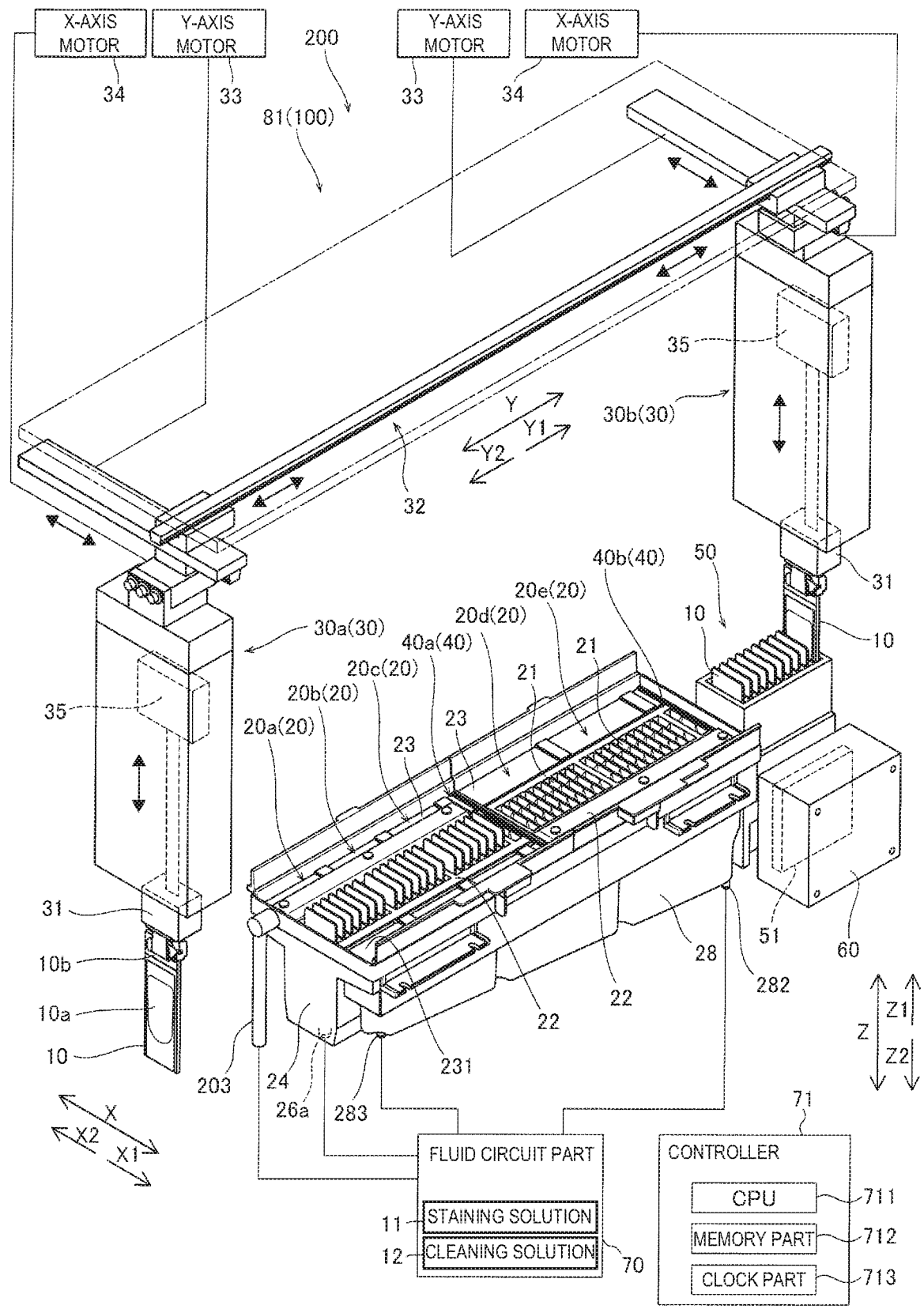
FIG. 4 is a perspective view illustrating a specific example configuration of a staining unit in a smear preparing apparatus.

In the example configuration in FIG. 4, the drying chamber 50 is disposed side by side with the staining chambers 20 and the cleaning chambers 40 in the Y direction. The drying chamber 50 has a function to dry the glass slide 10 having undergone the staining processing and the cleaning processing. The drying chamber 50 can hold the glass slides 10 each being spaced away from another. The drying chamber 50 includes an air passage inside (not shown), and the air passage is connected to the air blowing unit 60.

The air blowing unit 60 has a function to blow air to the glass slides 10 held in the drying chamber 50. The air blowing unit 60 includes, for example, an electrically-operated fan, and can forcibly send air into the air passage inside the drying chamber 50.

In the example configuration in FIG. 4, the smear preparing apparatus 200 includes a heater 51 to warm up the air sent from the air blowing unit 60. The air thus warmed up can speed up the drying process of the glass slide 10 having undergone staining processing, shortening the time required to complete the staining processing.

(Staining Chambers and Cleaning Chambers)

Next, the structures of the staining chambers 20 and the cleaning chambers 40 are described with reference to FIGS. 4 to 7.

Figure 5:
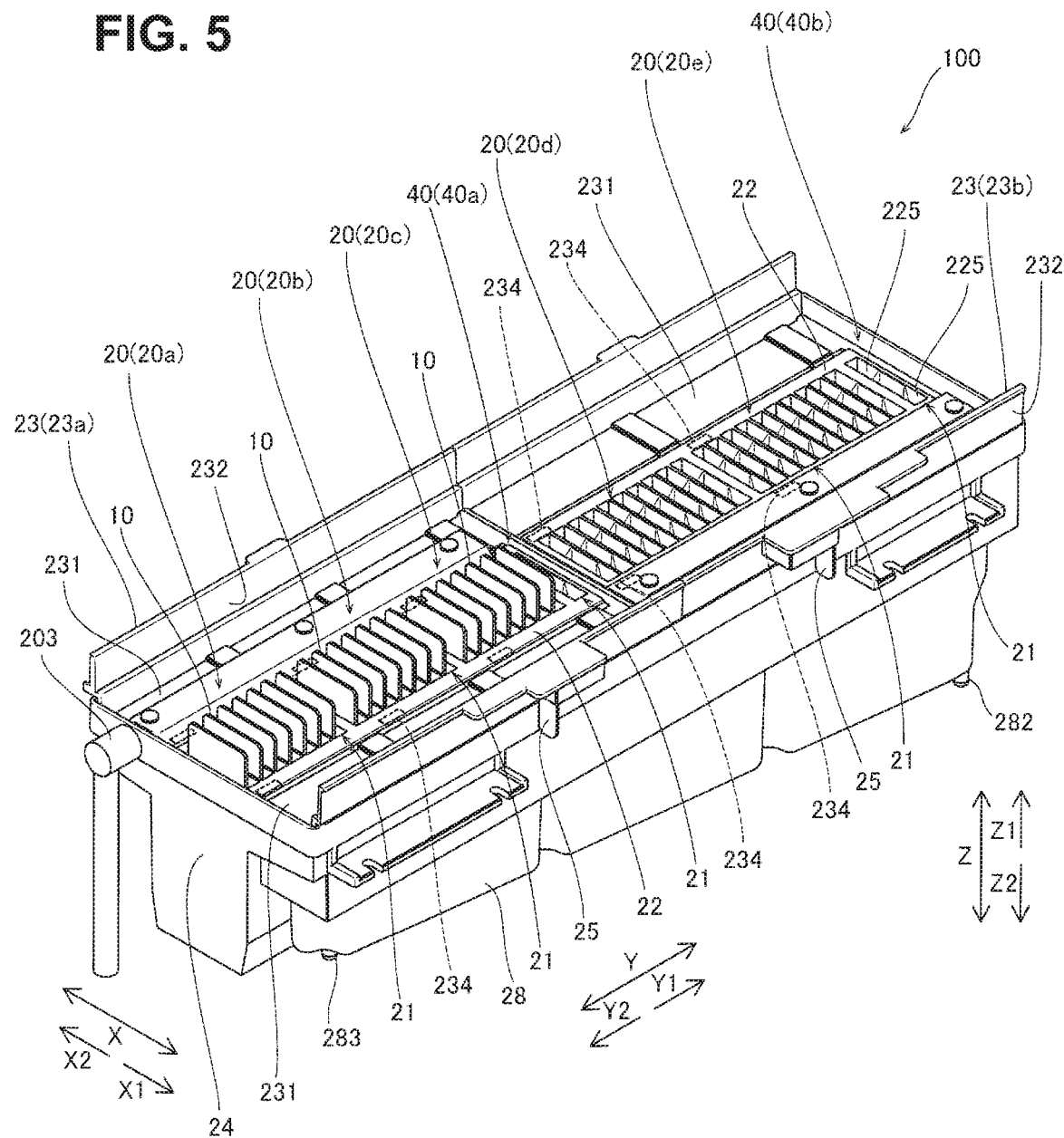
FIG. 5 is a perspective view illustrating a specific example configuration of a staining chamber in a smear preparing apparatus.
Figure 6:
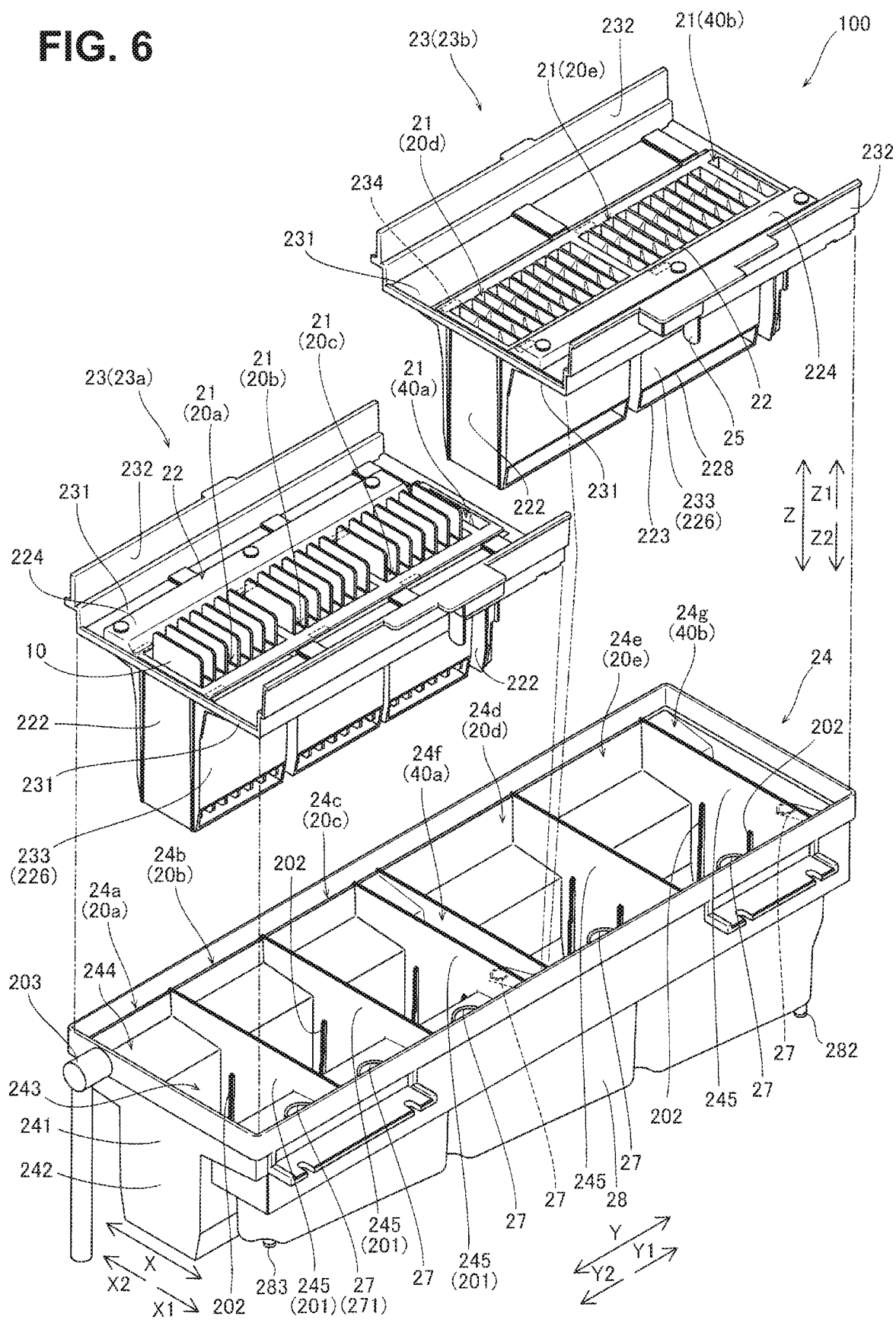
FIG. 6 is an exploded perspective view illustrating a state where cover parts are removed from chamber parts, such as in FIG. 5.

In the example configuration illustrated in FIGS. 4 to 6, each staining chamber 20 incudes the chamber part 24 or a tub to be filled with the staining solution 11. The chamber part 24 is provided separately from the cover part 23. The cover part 23 is removably set in or set on the chamber part 24 (see FIG. 6). Thereby, even if the cover part 23 gets soiled by the staining solution 11 dripping from the glass slide 10 being transported, the cover part 23 can be removed from the staining chamber 20 and cleaned easily.

In the example configuration illustrated in FIGS. 5 and 6, the cover part 23 includes the slide holder 22 to hold the glass slides 10 placed in the chamber part 24. Thus, the cover part 23 is set in such a manner as to be removable from the chamber part 24 together with the slide holder 22. Since soil or extraneous matter attached to a part such as narrow gaps in the insertion holes 21 can be washed away, the maintainability of the staining chamber 20 improves. Alternatively, the slide holder 22 may be provided in the chamber part 24 so that only the cover part 23 can be removed from the chamber part 24.

The slide holder 22 is configured to hold the glass slides 10 inserted into the chamber part 24 by the transport part 30. By the slide holder 22, the glass slides 10 can be stably held with their stain sections 10a immersed in the staining solution 11 in the chamber part 24.

When the smear preparing apparatus 200 is in operation, as illustrated in FIGS. 4 and 5, the cover part 23 and the slide holder 22 are fixed to the chamber part 24 with part of the cover part 23 and the slide holder 22 being set inside the chamber part 24. The transport part 30 inserts the glass slides 10 into the insertion holes 21 one by one. A smear applied to the glass slide 10 is stained by coming into contact with the staining solution 11 in the chamber part 24.

When maintenance of the smear preparing apparatus 200 is carried out, as illustrated in FIG. 6, the cover part 23 can be removed from the inside of the chamber part 24. Removal of the cover part 23 from the chamber part 24 enables the entire part of the slide holder 22 and the cover part 23 to be cleaned.

Note that the smear preparing apparatus 200 may be configured to be able to detect whether the cover part 23 is placed in the chamber part 24. In the example illustrated in FIGS. 5 and 6, the cover part 23 is provided with a detection piece 25. When the cover part 23 is set in the chamber part 24, the detection piece 25 is detected by a sensor (not shown). Such a configuration enables detection of whether the cover part 23 is being properly set in the chamber part 24 when the smear preparing apparatus 200 is in operation, preventing the cover part 23 from being forgotten to be set.

Note that in the example configuration in FIGS. 5 and 6, at least one of the chamber part 24 and the cover part 23 is black. This makes soil which may be attached to the staining solution 11 during transport of the glass slide 10 less noticeable. It also helps reduce degradation of the chamber part 24 and the cover part 23 due to light, if the chamber part 24 and the cover part 23 are resin moldings. Although it may be preferable that both of the chamber part 24 and the cover part 23 are black, only one of them may be black. Also, neither the chamber part 24 nor the cover part 23 may be black.

Further, in the example configuration in FIGS. 5 and 6, at least one of the chamber part 24 and the cover part 23 is made of any one of a polyphenylene sulfide (PPS) resin, a polypropylene (PP) resin, and a polyetherimide (PEI) resin. Thereby, the mechanical strength and chemical resistance of at least one of the chamber part 24 and the cover part 23 can be improved. Although it may be preferable that both of the chamber part 24 and the cover part 23 is made of any one of the above materials, only one of them may be made of any one of the above materials. Also, both of the chamber part 24 and the cover part 23 may be made of a material different from the above materials.

The staining chambers 20 and the cleaning chambers 40 may be integrally formed. In the example configuration in FIGS. 5 and 6, the five staining chambers 20, the first staining chamber 20a to the fifth staining chamber 20e, and the two cleaning chambers 40, the first cleaning chamber 40a and the second cleaning chamber 40b, are integrally formed. Thus, like the staining chamber 20, the cleaning chamber 40 also includes the chamber part 24 to be filled with the cleaning liquid 12 and the cover part 23 to be removably set in or set on the chamber part 24.

In the example in FIG. 6, a plurality of chamber parts 24 corresponding to the respective staining chambers 20 and cleaning chambers 40 are integrally provided. Specifically, the chamber parts 24 include chamber parts 24a to 24e that correspond to the five staining chambers 20. The chamber parts 24 further include chamber parts 24f and 24g that correspond to the two cleaning chambers 40. The chamber parts 24a to 24g are segregated from one another by partitioning members 245 so that the liquids do not flow between them. These chamber parts 24a to 24g may be provided separately. Each of the chamber parts 24a to 24g is provided with its own supply port 26a (see FIG. 8) and discharge port 26b (see FIG. 8). Through the supply ports 26a, the staining solutions 11 and the cleaning liquids 12 are supplied from the fluid circuit part 70 to the chamber parts 24a to 24g. Through the discharge ports 26b, the staining solutions 11 and the cleaning liquids 12 in the chamber parts 24a to 24g are discharged by the fluid circuit part 70.

The chamber parts 24 are open upward at their upper portions 241, and each of their lower portions 242 includes a bottom surface. When attached to the chamber parts 24 from above, the cover part 23 is partially located inside the chamber parts 24.

The cover part 23 includes: the insertion holes 21 as many as the number of glass slides 10 capable of being set in each staining chamber 20; and the insertion holes 21 as many as the number of glass slides 10 capable of being set in each cleaning chamber 40. In the example in FIGS. 5 and 6, the cover part 23 is split into two parts: a cover part 23a and a cover part 23b. The cover part 23a includes the insertion holes 21 for the chamber parts 24a to 24c and the insertion holes 21 for the chamber part 24f, and is set inside the chamber parts 24a to 24c and the chamber part 24f. The cover part 23b includes the insertion holes 21 for the chamber parts 24d and 24e and the insertion hole 21 for the chamber part 24g, and is placed inside the chamber parts 24d, 24e and the chamber part 24g. Note that the cover part 23a and the cover part 23b may be formed integrally, or the cover part 23 may be provided individually for each of the chamber parts 24a to 24g.

In an embodiment, the insertion holes 21 in the staining chambers 20 and the insertion holes 21 in the cleaning chambers 40 have the same shape. The insertion holes 21 are provided side by side along a straight line in the thickness direction thereof (Y direction) at predetermined intervals.

In the example configuration in FIGS. 5 and 6, the cover part 23 is provided to cover the upper portions 241 of the chamber parts 24 from above. The cover part 23 is formed to extend from one end to the other end of each chamber part 24 in the Y direction. The cover part 23 includes top plates 231 formed on the respective sides of the insertion holes 21 in the X direction.

In the example configuration in FIGS. 5 and 6, the cover part 23 also covers the regions between the insertion holes 21. Since the cover part 23 includes the slide holder 22 in this example configuration, the slide holder 22 surrounding each of the insertion holes 21 functions as part of the cover part 23. This effectively helps prevent the staining solution 11 from evaporating through between the adjacent glass slides 10.

In the example configuration in FIGS. 5 to 7, the cover parts 23 cover substantially the entire opening regions of the upper portions 241 of the chamber parts 24a to 24g (see FIG. 6), except for the insertion holes 21 for the glass slides 10 and ventilation portions 234 to be described later.

Also, in the example configuration in FIGS. 5 and 6, the cover part 23 is provided with plate-shaped portions 232 protruding or rising upward from the outer edge portions of the respective top plates 231 to prevent droplets falling onto the top surface of the cover part 23 from scattering outside the staining chambers 20 and the cleaning chambers 40.

Note that in the example configuration in FIG. 6, a spacer portion 202 is formed on an inner side surface 201 of each chamber part 24 to form a gap between the inner side surface 201 of the chamber part 24 and an outer side surface 222 of the cover part 23. Specifically, the spacer portion 202 includes a rib shape protruding from the surface of the partitioning member 245 toward the inside of the chamber part 24 in the Y direction, the partitioning member 245 extending vertically and constituting the inner side surface 201. The end surface of the spacer portion 202 in the protruding direction comes into contact with the outer side surface 222 of the cover part 23 in the Y direction, forming a gap 92 (see FIG. 9) in the Y direction between the inner side surface 201 of the chamber part 24 and the outer side surface 222 of the cover part 23.

If the inner side surface 201 of the chamber part 24 and the outer side surface 222 of the cover part 23 are too close to each other, the staining solution 11 may leak outside the chamber part 24 or to another adjacent chamber passing through between the inner side surface 201 of the chamber part 24 and the outer side surface 222 of the cover part 23 due to capillary action. By contrast, when a sufficient gap is kept by the spacer portion 202, leakage of the staining solution 11 to the outside of the chamber part 24 can be reduced. Note that it suffices if the spacer portion 202 is provided on one of the inner side surface 201 of the chamber part 24 and the outer side surface 222 of the cover part 23. Thus, the spacer portion 202 may be provided on the outer side surface 222 of the cover part 23. The spacer portion 202 may be any protrusion other than the rib. The spacer portion 202 may be provided separately from the chamber part 24 or the cover part 23.

In the example configuration in FIG. 6, each chamber part 24 includes a first portion 243 (see FIG. 8) in which the glass slide 10 is held by the slide holder 22. The chamber part 24 also includes second portions 244 (see FIG. 8) provided adjacent to the first portion 243 in the width direction of the glass slide 10 placed in the chamber part 24 (the X direction)

to allow the staining solution 11 to flow between the first portion 243 and the second portions 244. Each top plate 231 of the cover part 23 is provided to cover the corresponding second portion 244 of the chamber part 24 from above. Thereby, the second portions 244 adjacent to the first portion 243 can make the area of the liquid surface 11a of the staining solution 11 sufficiently large. Even though the second portions 244 are provided, the top plates 231 of the cover part 23 can effectively help prevent evaporation of the staining solution 11 in the second portions 244.

In the example configuration in FIGS. 5 and 6, regions directly above the second portions 244 and the top plates 231 form transport regions for the glass slide 10. The transport regions are adjacent to the insertion holes 21 in the X direction. The transport part 30 transports the glass slide 10 by detouring the region directly above the glass slides 10 set in the first portion 243 and moving above the top plates 231 covering the second portions 244.

Figure 7:
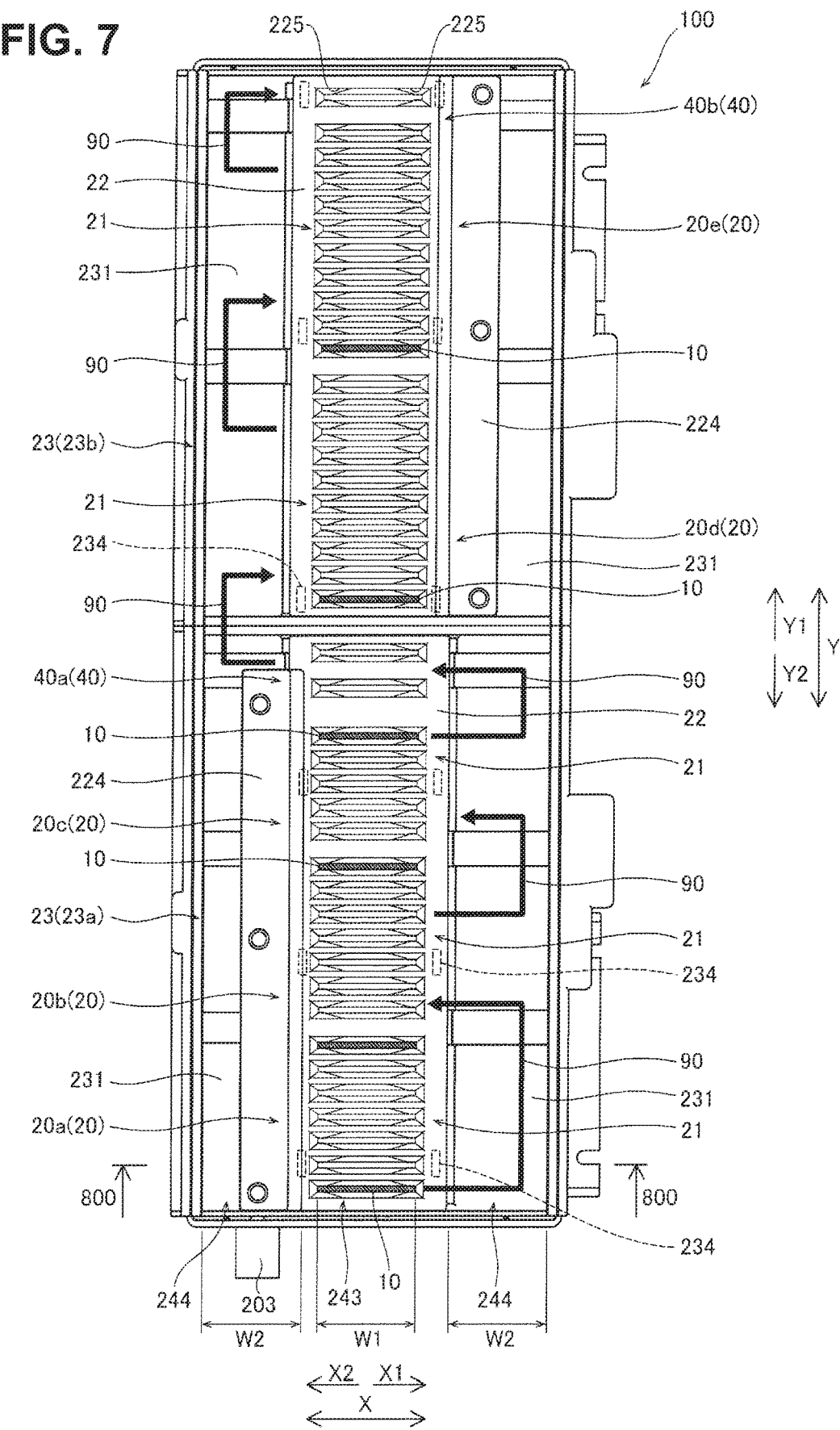
FIG. 7 is a schematic top view of staining chambers and cleaning chambers, such as in FIG. 5.

Specifically, as illustrated in FIG. 7, the staining chambers 20 and the cleaning chambers 40 are arranged from the Y2-side end portion toward the Y1 side in accordance with the order of processing steps of the staining processing and the cleaning processing. The transport part 30 transports the glass slides 10 to the first staining chamber 20a to the fifth staining chamber 20e and the first cleaning chamber 40a and the second cleaning chamber 40b one at a time, in turn from the first staining chamber 20a closest to the Y2 side. The transport part 30 transports the glass slide 10 among the staining chambers 20 and the cleaning chambers 40, moving along a route 90 that vertically overlaps the top plate 231 of the cover part 23. This helps prevent the staining solution 11 dripping from the glass slide 10 being transported from soiling a portion of the set glass slide 10 outside the section to be stained.

Note that in the X direction, the widths of the first portion 243 and the second portion 244 are each equal to or larger than the width W1 of the glass slide 10. Specifically, the first portion 243 has a width W4 (see FIG. 8), and the second portion 244 has a width W2. More specifically, the width W4 not less than the width W1 of one glass slide 10 is secured in the first portion 243, and the width W2 not less than the width W1 is also secured in each second portion 244 adjacent to the first portion 243. Thus, it is ensured that when the glass slide 10 is transported above the second portion 244, the staining solution 11 dripping from the transported glass slide 10 does not fall on the glass slide 10 being set.

Next, the structures of the staining chambers 20 and the cleaning chambers 40 are described in detail with reference to FIGS. 8 and 9. The staining chambers 20 and the cleaning chambers 40 each have basically the same structure except for the number of the insertion holes 21. Thus, the following describes the structure of one staining chamber 20 in detail. In the following description, the staining solution 11 and the staining chamber 20 may be substituted with the cleaning liquid 12 and the cleaning chamber 40, respectively.

<Structure of the Chamber Part>

Figure 8:
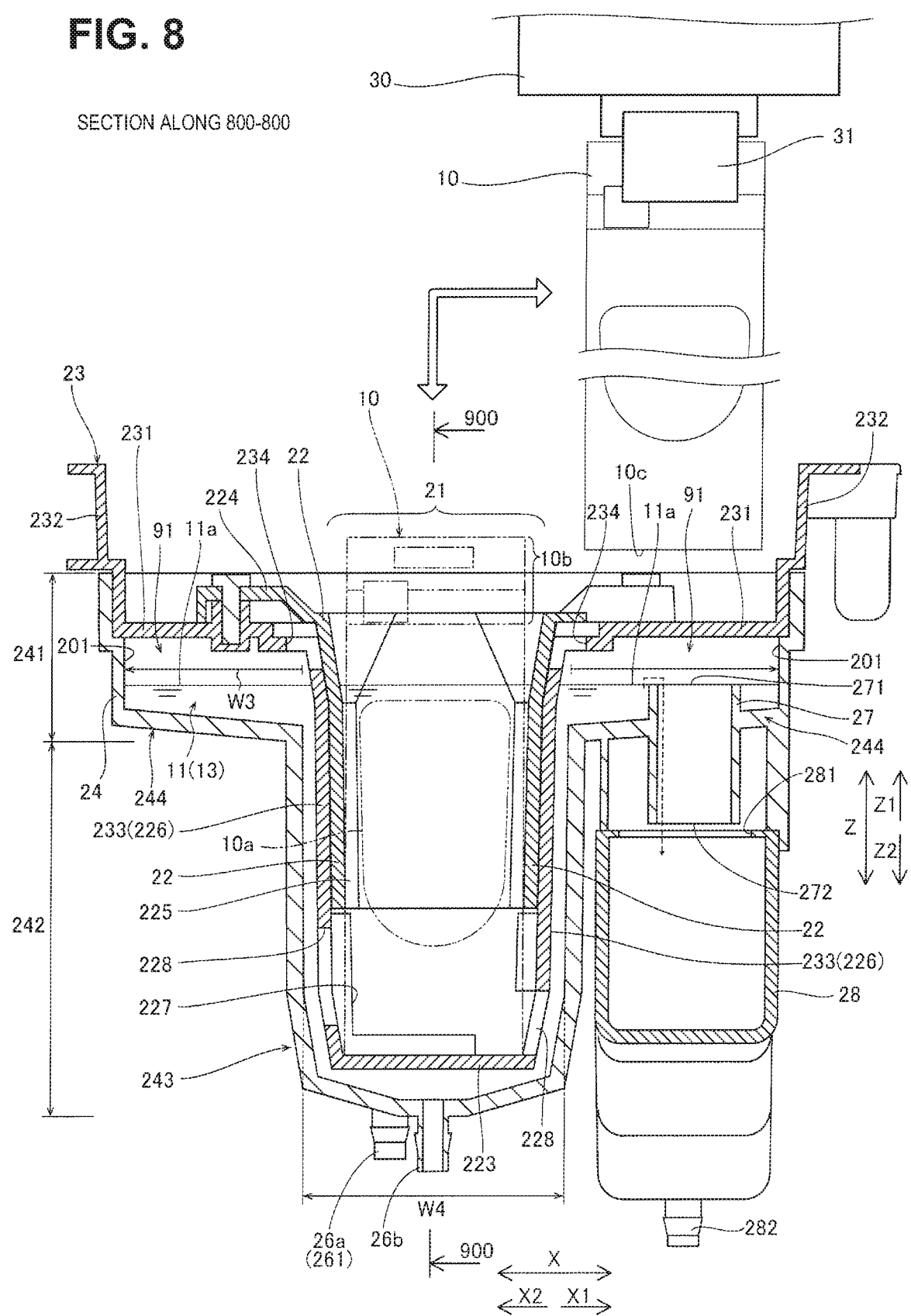
FIG. 8 is an enlarged sectional view taken along line 800-800 in FIG. 7.

In the example configuration in FIG. 8, the first portion 243 of the chamber part 24 is deeper than each second portion 244 of the chamber part 24. The first portion 243 is provided to a depth reaching the lower portion 242 of the chamber part 24, and the second portion 244 is provided in the upper portion 241 without reaching the lower portion 242 of the chamber part 24. The depth of the first portion 243 is substantially equal to the sum of Z-direction lengths of the upper portion 241 and the lower portion 242. The depth of the second portion 244 is substantially equal to the Z-direction length of the upper portion 241. Consequently, in FIG. 8, in the width direction of the glass slide 10 placed in the chamber part 24 (in the X direction), the inside dimension W3 of the upper portion 241 of the chamber part 24 is larger than the inside dimension W4 of the lower portion 242 of the chamber part 24. This configuration enables taking in and out of the glass slide 10 to cause less change in the liquid surface of the staining solution 11 in the upper portion 241, and owing to the small inside dimension W4 of the lower portion 242, reduces the liquid amount of the staining solution 11 used.

More specifically, the second portions 244 are disposed adjacent to the first portion 243 in the X direction, at the respective sides of the first portion 243, and are covered by the top plates 231. The second portions 244 are not provided in the lower portion 242. Thus, the chamber part 24 has an internal space shaped like a letter-T in section formed by the first portion 243 and the second portions 244 on both sides of the first portion 243. Note that the internal space is a space portion forming a region for storing the staining solution 11. The inside dimension W4 of the lower portion 242 is substantially equal to the width of the first portion 243. The inside dimension W3 of the upper portion 241 is substantially equal to the sum of the width W4 of the first portion 243 and the widths W2 of the two second portions 244 on the respective sides. This configuration can increase the area of the liquid surface of the staining solution 11 in the upper portion 241 more effectively without increasing the volume of the chamber part 24.

In the example configuration in FIG. 8, the chamber part 24 includes a discharge port 27 to define the upper-limit level of the liquid surface 11a of the staining solution 11 contained in the chamber part 24. When the liquid surface is going to exceed the upper-limit level, an excess part of the staining solution 11 is discharged through the discharge port 27 to keep the liquid surface 11a at the upper-limit level. Thereby, when the staining solution 11 is additionally supplied to the chamber part 24 for example, the liquid surface can be kept at the constant upper limit without detection of the liquid surface 11a or precise management of the liquid amount of the staining solution 11 to be added.

In the example configuration in FIG. 8, the discharge port 27 has a tubular shape extending vertically, and is provided in the upper portion 241 of the chamber part 24. The discharge port 27 is provided in each of the chamber parts 24a to 24g (see FIG. 6). When the liquid surface 11a of the staining solution 11 exceeds an upper end portion 271 of the discharge port 27, the staining solution 11 is discharged through the discharge port 27. In other words, the upper end portion 271 of the discharge port 27 is the upper-limit level for the liquid surface 11a. The upper-limit level of the liquid surface 11a is located higher than or above the stain section 10a and lower than the print section 10b of the glass slide 10 held by the slide holder 22. Thereby, even if the liquid surface 11a rises to the upper-limit level, the staining solution 11 does not reach the print section 10b. Further, when the staining solution 11 additionally supplied to the chamber part 24 is in an amount such that the liquid surface 11a is brought to the upper-limit level, the liquid surface 11a can be kept close to the upper-limit level at all times. This helps prevent the staining solution from being deficient and failing to stain the vicinity of an upper end portion of the stain section 10a.

Provided under the discharge port 27 is a collection tank 28. A lower end portion 272 of the discharge port 27 is open toward an opening 281 in an upper portion of the collection tank 28. The staining solution 11 flowing into the discharge port 27 is sent from the discharge port 27 into the collection tank 28.

Note that, to be able to collect the staining solutions 11 and the cleaning liquids 12 from the discharge ports 27 of the respective staining chambers 20 and cleaning chambers 40, the collection tank 28 is provided adjacent to the staining chambers 20 and cleaning chambers 40 (see FIG. 6), extending in the Y direction. Liquids in the collection tank 28 are discharged through a discharge port 282 provided in the lowermost portion of the bottom portion of the collection tank 28. The bottom portion of the collection tank 28 is provided with another discharge port 283 (see FIG. 6) at a position higher than or above the discharge port 282. The discharge port 283 functions as a backup port of the discharge port 282. Note that a discharge port 203 (see FIG. 6) is provided near an upper end portion of the chamber part 24. The discharge port 203 is an emergency discharge port used when neither of the discharge ports 282 and 283 is usable.

<Structures of Slide Holder and Cover Part>

In the example configuration illustrated in FIG. 8, the cover part 23 includes a bottom portion 223 which is to be placed inside the chamber part 24 and to hold the lower end portion 10c of the glass slide 10. The bottom portion 223 is located closer to the bottom surface of the chamber part 24 than to the liquid surface 11a of the staining solution 11, and gets immersed in the staining solution 11. The cover part 23 is formed integrally with the bottom portion 223. Specifically, the top plates 231 and inner walls 233 of the cover part 23 are connected to the bottom portion 223 from both of its sides in the X direction. Thereby, even if the glass slide 10 is broken or foreign matter attaches to the glass slide 10, the broken piece or foreign matter is received by the bottom portion 223 of the cover part 23. This can prevent the broken piece or foreign matter from accumulating in the chamber part 24. Since the cover part 23 including the bottom portion 223 is removable from the staining chamber 20, the broken piece or foreign matter having fallen on the bottom portion 223 can be easily removed.

Also, in the example configuration illustrated in FIG. 8, the slide holder 22 is detachably attached to the cover part 23 and the bottom portion 223. The slide holder 22 is configured as a member with which the insertion holes 21 are integrally formed. Specifically, tubular holding wall portions surrounding the respective insertion holes 21 are arranged in the direction in which the insertion holes 21 are arranged and integrally constitute the slide holder 22. In this case, removal of the slide holder 22 can open a region above the bottom portion 223. Then, a broken piece and foreign matter having fallen on the bottom portion 223 can be removed even more easily. Further, when the slide holder 22 is thus a separate member from the cover part 23, the precision management of the slide holder 22 coming into contact with the glass slides 10 can be easily performed. As a result, the positioning of each glass slide 10 and taking in and out of the glass slide 10 can be carried out easily and precisely.

The slide holder 22 is provided for each cover part 23. Specifically, the slide holder 22 for the cover part 23a (see FIG. 7) is configured as a single member that partitions groups of the insertion holes 21 corresponding to the chamber parts 24a to 24c and a group of the insertion holes 21 corresponding to the chamber part 24f from one another. Similarly, the slide holder 22 for the cover part 23b (see FIG. 7) is configured as a single member that partitions groups of the insertion holes 21 corresponding to the chamber parts 24d and 24e and a group of the insertion holes 21 corresponding to the chamber part 24g from one another.

The slide holder 22 includes an attachment portion 224 used to attach the slide holder 22 to the cover part 23. The attachment portion 224 is formed to extend from the upper end portion of the slide holder 22 to a space above the upper surface of one of the top plates 231. By the attachment portion 224 being secured to the top plate 231 by means of screwing or the like, the slide holder 22 is attached to the cover part 23 and the bottom portion 223.

In the example configuration in FIG. 8, the slide holder 22 is provided to extend from the cover part 23 toward the bottom portions of the chamber parts 24 (the Z2 side), and is configured to hold the glass slides 10 immersed in the staining solution 11. The slide holder 22 thus extending from the cover part 23 toward the bottom portions of the chamber parts 24 supports the side surfaces of the glass slides 10 and stably holds the glass slides 10. The slide holder 22 extends downward from a position where the top plate 231 is provided, to a position higher than or above the bottom portion 223. The staining solution 11 and the cleaning liquid 12 can flow between the slide holder 22 and the bottom portion 223.

In the width direction of the glass slide 10 (the X direction), the gap in the slide holder 22 gradually gets smaller from the upper portion to the lower portion. The slide holder 22 thus has a function to guide each glass slide 10 so that its position in the X direction may be brought to a proper position.

Figure 9:
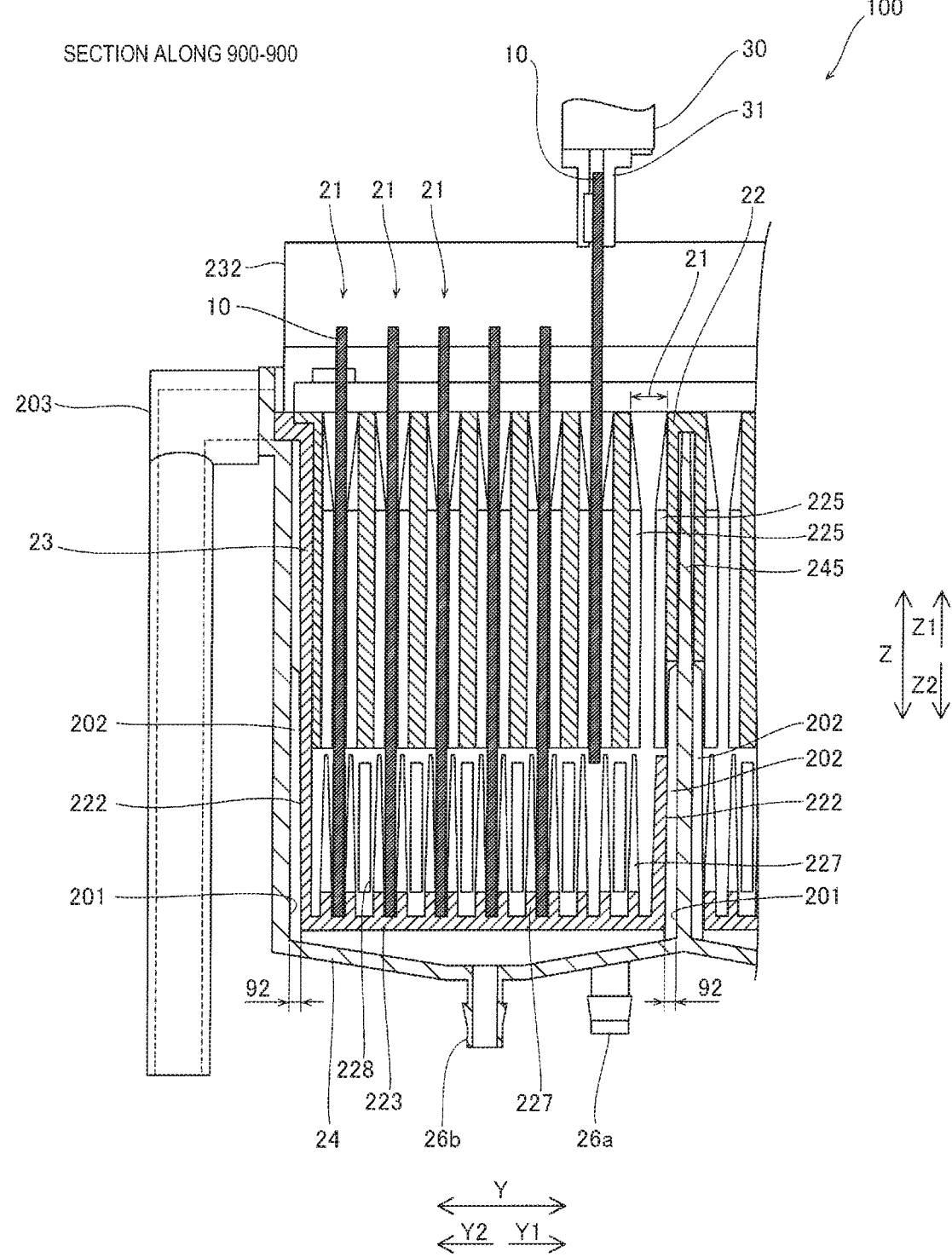
FIG. 9 is a partial sectional view taken along line 900-900 in FIG. 8.

Further, as illustrated in FIG. 9, in the thickness direction of the glass slide 10 (the Y direction), at least parts of the slide holder 22 are tapered toward the upper end portion. In the example in FIG. 9, the slide holder 22 is provided with guide portions 225 protruding from the slide holder 22 in the thickness direction of the slide holder 22 (the Y direction), and the guide portions 225 protrude in the Y direction less and less toward the upper end portion of the slide holder 22. Thus, the gap between the guide portions 225 in the thickness direction also gets gradually smaller from the upper part to the lower part of the slide holder 22. The slide holder 22 thus has a function to guide each glass slide 10 so that its position in the Y direction may be brought to a proper position.

Thus configured, the slide holder 22 holds the glass slides 10 inserted in the chamber parts 24 upright with the longitudinal direction of the glass slides 10 being along the vertical direction (the Z direction). The slide holder 22 is also configured to hold the glass slides 10 at respective holding positions arranged in the thickness direction of the glass slides 10 (the Y direction) (see FIG. 7). Thereby, the glass slides 10 can be placed to extend vertically in the chamber part 24. As a result, the area of a horizontal section of the glass slide 10 being set is smaller than when the glass slide 10 is set with its longitudinal direction being along any other direction. Thus, the volume of the lower portion 242 of each chamber part 24 can be sufficiently reduced.

Note that the cover part 23 includes rib-shaped portions 227 (see FIG. 9) formed on side surface portions 226 in the X direction and the bottom portion 223. The rib-shaped portions 227 are formed immediately below the guide portions 225 to support the lower edge portions of the glass slides 10 in the thickness direction.

In the example configuration in FIG. 8, the cover part 23 includes the side surface portions 226 that connect the bottom portion 223 to the respective top plates 231. The side surface portions 226 include communication ports 228 so that the staining solution 11 in the chamber part 24 can flow into the cover part 23. The communication ports 228 can efficiently bring the staining solution 11 into contact with the glass slides 10 held in the cover part 23, and thus enable efficient staining processing.

Specifically, in the cover part 23 of FIG. 8, the bottom portion 223 is formed integrally with the top plates 231 and the inner walls 233. Thus, a lower portion of the inner wall 233 of the cover part 23 also functions as the side surface portions 226 of the cover part 23. Each communication port 228 is located at a lower portion of the side surface portion 226 of the cover part 23, near the bottom portion 223. The communication port 228 penetrates through the side surface portion 226 to allow the outside of the cover part 23 to communicate with the inside of the cover part 23 where the glass slides 10 are set. Through the communication ports 228, the staining solution 11 supplied to the chamber part 24 easily flows into the cover part 23.

The bottom portion 223 is located at a position upward of and spaced away from the bottom portion of the chamber part 24. The side surface portions 226 is located at a position spaced away from the inner side surface of the chamber part 24. Since a gap is thus created between the inner surface of the chamber part 24 and each of the bottom portion 223 and the side surface portions 226, the bottom portion 223 and the side surface portions 226 do not hinder the flow of the staining solution 11 inside the chamber part 24.

Note that the cover part 23 do not have to be provided with the bottom portion 223 and the side surface portions 226. In such a case, the lower end portions 10c of the glass slides 10 may be supported by the bottom portion of the chamber part 24. The cover part 23 may be provided only with the bottom portion 223, without the side surface portions 226. When the side surface portions 226 are provided, the side surface portions 226 can keep a broken piece or foreign matter having fallen on the bottom portion 223 from falling further down onto the bottom portion of the chamber part 24.

In the example configuration in FIG. 8, the top plates 231 of the cover part 23 are each formed to extend from the inner side surface 201 of the chamber part 24 toward the insertion holes 21 in the width direction of the glass slides 10 placed in the chamber part 24 (the X direction). Then, the inner walls 233 of the cover part 23 extend from the respective end portions of the top plates 231 on the insertion holes 21 side toward the bottom portion of the chamber part 24 or toward the bottom portion 223 of the cover part 23 to a position immersed under the liquid surface 11a of the staining solution 11. Thereby, the inner side surfaces 201 on both sides of the chamber part 24 in the X direction, the top plates 231, the inner walls 233, and the liquid surface 11a of the staining solution 11 surround and define spaces 91. Thereby, the evaporated staining solution 11 can be held within each space 91 isolated from the insertion holes 21. As a result, the space 91 tends to become saturated by the vapors of the vaporized staining solution 11, allowing a further reduction in the amount of the staining solution 11 evaporated.

In this example configuration, the cover part 23 includes the ventilation portions 234 to let the air or gas in the space surrounded by the inner side surface 201 of the chamber part 24, the top plate 231, the inner wall 233, and the liquid surface 11a of the staining solution 11 escape to the outside the chamber part 24. If the surrounded space 91 were completely airtight, air discharge during the supply of the staining solution 11 and air supply during the discharge of the staining solution 11 would become difficult, possibly hindering the supply and discharge of the staining solution 11. When the minimum air flow is secured by the ventilation portions 234, the supply and discharge of the staining solution 11 may be facilitated even if the space 91 is formed to keep evaporated gas inside.

In the example configuration in FIG. 8, the ventilation portions 234 are each formed by a penetration hole penetrating the lower surface side and the upper surface side of the cover part 23. The opening area of the ventilation portion 234 is smaller than the opening area of the insertion hole 21. The ventilation portions 234 form minute gaps between the slide holder 22 and the end portion of the top plate 231 on the slide holder 22 side. Instead of the penetration holes, the ventilation portions 234 may be notched portions formed by notching of an end portion of the top plate 231. Moreover, each ventilation portion 234 which may for example be formed by a penetration hole may be connected to an end of a gas flowing tube the other end of which is connected to a valve. Then, if the valve is opened during supply and discharge of the staining solution 11 and closed during times other than the supply and discharge, gas flow can be minimized with airtightness of the space 91 achieved.

Moreover, in the example configuration in FIG. 8, the top plate 231 is formed to cover the range from the inner side surface 201 of the chamber part 24 to the slide holder 22. The inner wall 233 is in contact with the slide holder 22 and extends downward along the slide holder 22. Since substantially the entire region of the chamber part 24 except for the insertion holes 21 can be thus covered by the top plate 231 and the slide holder 22, evaporation of the staining solution 11 can be reduced all the more effectively. Further, the inner wall 233 extending along the slide holder 22 can increase the space 91 surrounded by the inner side surface 201 of the chamber part 24, the top plate 231, the inner wall 233, and the liquid surface 11a of the staining solution 11. This leads to a further improvement in the effect of the cover part 23 reducing evaporation of the staining solution 11.

(Staining Operation by Smear Preparing Apparatus)

With reference to FIGS. 4, 7, 10, and 11, a description is given of the staining operation performed by the staining unit 81 of the smear preparing apparatus 200 (i.e., the staining operation by the smear staining apparatus 100). The controller 71 controls the smear preparing apparatus 200.

Figure 10:
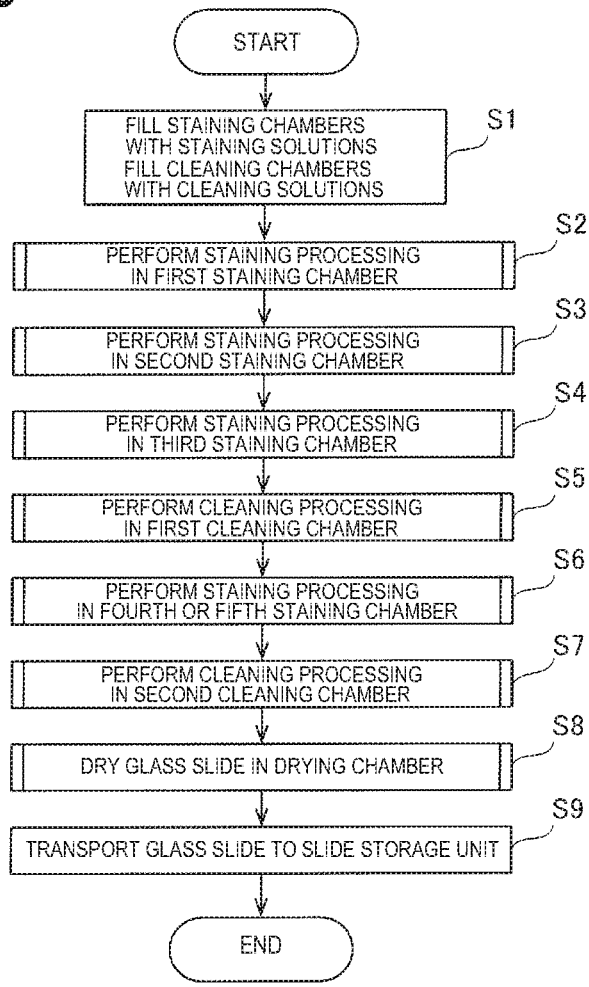
FIG. 10 is a flowchart illustrating an example of how a staining unit operates.

First, in Step S1 in FIG. 10, the chamber parts 24 of the staining chambers 20 and the cleaning chambers 40 are filled with the staining solutions 11 and the cleaning liquids 12, respectively. The fluid circuit part 70 (see FIG. 4) supplies the staining solutions 11 and the cleaning liquids 12 to the staining chambers 20 and the cleaning chambers 40 through their respective supply ports 26a (see FIG. 8).

In Step S2, the transport part 30 transports the glass slides 10 to the first staining chamber 20a (see FIG. 7) one by one, and staining processing is performed in the first staining chamber 20a.

Figure 11:
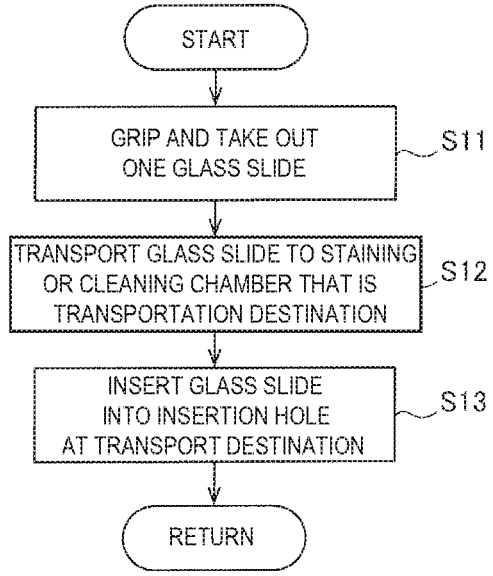
FIG. 11 is a flowchart illustrating staining processing and cleaning processing in FIG. 10.

Specifically, in Step S11 in FIG. 11, the transport part 30 grips and takes out a single smeared glass slide 10. In Step S12, the transport part 30 transports the glass slide 10 to a position above the first staining chamber 20a, which is a transport destination. In this event, the transport part 30 transports the glass slide 10 following the route 90 illustrated in FIG. 7. In Step S13, the transport part 30 inserts the gripped glass slide 10 into one of the insertion holes 21 in the transport-destination first staining chamber 20a. The operation depicted in FIG. 11 is common to Steps S3 to S7 to be described later, with only differences being the position from which the glass slide 10 is taken out and the destination to which the glass slide 10 is transported.

The first staining chamber 20a is filled with a first staining solution 11. Staining processing is performed in this state by immersing the glass slide 10 in the first staining solution 11 for a preset period of time T1.

Referring back to FIG. 10, in Step S3, the transport part 30 transports the glass slide 10 to the second staining chamber 20b (see FIG. 7), and staining processing is performed in the second staining chamber 20b. Through Steps S11 to S13 in FIG. 11, the transport part 30 takes out the glass slide 10 from the first staining chamber 20a and inserts the glass slide 10 into one of the insertion holes 21 in the second staining chamber 20b. For a preset period of time T2, the glass slide 10 is immersed in a second staining solution 11 contained in the second staining chamber 20b.

In Step S4, the transport part 30 transports the glass slide 10 to the third staining chamber 20c (see FIG. 7), and staining processing is performed in the third staining chamber 20c. Through Steps S11 to S13 in FIG. 11, the transport part 30 takes out the glass slide 10 from the second staining chamber 20b and places the glass slide 10 into one of the insertion holes 21 in the third staining chamber 20c. For a preset period of time T3, the glass slide 10 is immersed in a third staining solution 11 contained in the third staining chamber 20c.

In Step S5, the transport part 30 transports the glass slide 10 to the first cleaning chamber 40a (see FIG. 7), and cleaning processing is performed in the first cleaning chamber 40a. The operation for the transport to the first cleaning chamber 40a is similar to the operation for the transport to the staining chamber 20. Specifically, in Step S11 in FIG. 11, the transport part 30 grips and takes out a single glass slide 10 from the third staining chamber 20c. In Step S12, following the route 90 (see FIG. 7), the transport part 30 transports the glass slide 10 to a position above the first cleaning chamber 40a, which is a transport destination. In Step S13, the transport part 30 inserts the gripped glass slide 10 into one of the insertion holes 21 in the transport-destination first cleaning chamber 40a. For a preset period of time T4, the glass slide 10 is immersed in a first cleaning liquid 12 contained in the first cleaning chamber 40a.

In Step S6, the transport part 30 transports the glass slide 10 to either the fourth staining chamber 20d or the fifth staining chamber 20e, and staining processing is performed in the fourth staining chamber 20d or the fifth staining chamber 20e (see FIG. 7), which is a transport destination. The fourth staining chamber 20d and the fifth staining chamber 20e are both filled with a fourth staining solution 11. Through Steps S11 to S13 in FIG. 11, the transport part 30 takes out the glass slide 10 from the first cleaning chamber 40a and inserts the glass slide 10 into one of the insertion holes 21 in the fourth staining chamber 20d or the fifth staining chamber 20e. For a preset period of time T5, the glass slide 10 is immersed in the fourth staining solution 11.

In Step S7, the transport part 30 transports the glass slide 10 to the second cleaning chamber 40b (see FIG. 7), and cleaning processing is performed in the second cleaning chamber 40b. Through Steps S11 to S13 in FIG. 11, the transport part 30 takes out the glass slide 10 from the fourth staining chamber 20d or the fifth staining chamber 20e and inserts the glass slide 10 into the insertion hole 21 in the second cleaning chamber 40b. For a preset period of time T6, the glass slide 10 is immersed in a second cleaning liquid 12 in the second cleaning chamber 40b.

In Step S8, the transport part 30 transports the glass slide 10 to the drying chamber 50 (see FIG. 4), and the glass slide 10 is dried in the drying chamber 50.

Specifically, the transport part 30 grips and takes out a single glass slide 10 from the second cleaning chamber 40b. The transport part 30 transports the glass slide 10 to a position above the drying chamber 50 (see FIG. 4), which is a transport destination, and inserts the gripped glass slide 10 into the drying chamber 50. The controller 71 turns on the heater 51 (see FIG. 4) and the air blowing unit 60 (see FIG. 4) to send hot air to the glass slide 10 held in the drying chamber 50. The hot air is applied to the glass slide 10 in the drying chamber 50 for a preset period of time T7. With this, smear staining processing on a single glass slide 10 is complete.

In Step S9, the transport part 30 takes out the single glass slide 10 having undergone the staining processing from the drying chamber 50, and transports the glass slide 10 to the slide storage unit 86 (see FIG. 3). This is how the staining operation is performed.

(Smear Preparation Apparatus and Staining Solution Supply Operation)

With reference to FIG. 8 and FIGS. 12 to 15, a description is given of staining solution supply operation performed by the smear preparing apparatus 200. The controller 71 controls the smear preparing apparatus 200.

As illustrated in FIG. 8, the chamber part 24 includes: a supply port 261 that supplies the staining solution 11 into the chamber part 24 while coming into contact with the staining solution 11; and the discharge port 27 that is disposed higher than or above the supply port 261 (the Z1 side) and discharges the staining solution 11. Since the discharge port 27 is provided in an upper part of the chamber part 24, an excess of the staining solution 11 can be discharged through the discharge port 27. As a result, the liquid upper edge surface of the staining solution 11 can be kept constant in the chamber part 24 at all times, and therefore the fluid circuit or control for keeping the staining solution level constant can be simplified. Further, when the chamber part 24 is replenished with the staining solution 11 from the supply port 261 in a lower part thereof, an excess of the staining solution 11 is discharged through the discharge port 27 in the upper part, which causes the staining solution 11 to be circulated and agitated within the chamber part, helping prevent problems such as uneven concentration or freshness of the staining solution 11 in the chamber.

The smear preparing apparatus 200 can operate not only in a regular mode in which the printing unit 83 performs printing processing, the smearing unit 84 performs smearing processing, and the staining unit 81 performs staining processing, but also in a smearing mode in which printing processing and smearing processing are performed. The smear preparing apparatus 200 can also operate in a staining mode in which the staining unit 81 performs staining processing on the glass slide 10 smeared with a sample. The smear preparing apparatus 200 can also operate in a printing mode in which the printing unit 83 prints various pieces of information on the print section 10b of the glass slide 10. In other words, the user can select from the regular mode, the smearing mode, the staining mode, and the printing mode and cause the smear preparing apparatus 200 to operate in the selected mode.

The controller 71 controls supply of a predetermined amount of the staining solution 11 into the chamber part 24 through the supply port 261. For example, the controller 71 controls replenishment of the chamber part 24 with the staining solution 11 when staining work is being or is to be performed on the glass slide 10. The controller 71 also controls replenishment of the chamber part 24 with the staining solution 11 when at least one glass slide 10 is placed in the chamber part 24. Specifically, the controller 71 causes a fluid mechanism 700 to replenish the chamber part 24 with the staining solution 11 with at least one glass slide 10 placed in the chamber part 24. The controller 71 also controls replenishment of the chamber part 24 with the staining solution 11 when the smear preparing apparatus 200 is set to the regular mode or the staining mode, in which the staining unit 81 performs staining processing.

Thereby, with a constant amount of the staining solution 11 being maintained in the chamber part 24 using the supply port 261, the staining solution 11 can be partially replaced (replenishment of the chamber part 24 with the staining solution 11 and discharge of an excess of the staining solution 11). Since partial replenishment with the staining solution 11 is carried out in the chamber part 24, staining processing can be continued in the smear preparing apparatus 200. Thereby, the liquid properties of the staining solution 11 (the staining properties of the staining solution 11) can be maintained without stopping the operation of the smear preparing apparatus 200, which can improve the rate of operation. Further, since the staining solution 11 is not entirely replaced through supply after discharge, this helps prevent the sample staining level from changing before and after the replenishment with the staining solution 11. Thereby, variation in staining quality is reduced.

The smear preparing apparatus 200 is configured to be able to receive a setting from a user to determine the timing to supply the staining solution 11 into the chamber part 24. For example, the smear preparing apparatus 200 receives a setting for the timing to supply the staining solution 11 into the chamber part 24, inputted by a user on a setting screen as illustrated in FIG. 12. In the example illustrated in FIG. 12, the replenishment timing for the staining solution 11 can be set for an undiluted solution group and a diluted staining solution group. The undiluted solution group includes an undiluted solution of the staining solution 11 and methanol. The diluted staining solution group includes a diluted staining solution which is a staining solution diluted with a phosphate buffer solution or the like. Grouping the staining solutions 11 based on the types of the staining solution 11 enables the timing to supply the staining solutions 11 to be set collectively and easily, compared to when the supply timing is set for each individual type of the staining solution 11.

As illustrated in FIG. 12A, for the undiluted solution group, a time elapsed and the number of glasses prepared (the number of glasses stained) since the last, the latest or a previous replenishment or supply with the staining solution 11 can be set as the timing to supply the chamber part 24 with the staining solution 11. Setting an elapsed time allows replenishment with the staining solution 11 after every predetermined period of time to compensate for the staining solution 11 evaporated. Setting the number of glasses prepared allows replenishment with the staining solution 11 to compensate for the staining solution 11 that has flowed out as the glass slides 10 are transported out. For the undiluted solution group, the elapsed time may be set to, for example, a time between 30 minutes and 2 hours, both inclusive. Further, the number of glasses prepared may be set to, for example, a value between 10 and 50, both inclusive. The controller 71 is configured to control the fluid mechanism 700 to replenish the chamber part 24 with the staining solution 11 based on an elapsed lapse since the last, the latest or a previous replenishment or supply with the staining solution 11, the elapsed time being counted by the clock part 713. Further, the controller 71 is configured to control the fluid mechanism 700 to replenish the chamber part 24 with the staining solution 11 based on the number of glass slides 10 prepared since the last replenishment with the staining solution 11, the number of glasses being stored in the memory part 712.

The condition of the elapsed time and the condition of the number of glasses prepared may be independent of each other. Specifically, the elapsed time and the number of glasses prepared may be counted independently. For example, if the condition of the elapsed time and the condition of the number of glasses prepared coincide with each other, the staining solution 11 may be added two times in a row.

As illustrated in FIG. 12B, for the diluted solution group, an elapsed time since the last replenishment with the staining solution 11 can be set. As to a diluted staining solution, only an elapsed time may be set because deterioration of the staining solution 11 is caused more dominantly by factors such as a lapse of time than the number of glasses prepared. For the diluted solution group, the elapsed time may be set to, for example, a time between 12 minutes and 4 hours, both inclusive.

Note that the supply timing set may be a predetermined time of day, in addition to an elapsed time and the number of glasses prepared. Specifically, the chamber part 24 may be replenished with the staining solution 11 when the clock strikes a predetermined time. Further, the timing to supply the staining solution 11 may be set for each type of the staining solutions 11 without grouping the types of the staining solution 11 to be added.

Note that in the regular mode and the staining mode, the controller 71 receives an instruction to perform staining work on glass slides. On the other hand, when the smear preparing apparatus 200 is in the smearing mode or printing mode, powered off, or in standby, the controller 71 does not receive an instruction to perform staining work on glass slides.

The controller 71 is configured to perform control such that replenishment of the chamber part 24 with the staining solution 11 is stopped when staining work on the glass slides 10 is paused, and replenishment of the chamber part 24 with the staining solution 11 is performed when staining work on the glass slides 10 is resumed. Since replenishment with the staining solution 11 is thus not performed while the staining work is paused, wasteful consumption of the staining solution 11 can be reduced. Specifically, the controller 71 is configured to control the fluid mechanism 700 to replenish the chamber part 24 with the staining solution 11 upon receiving an instruction to perform staining work on the glass slides 10. Further, the controller 71 is configured to control the fluid mechanism 700 to pause staining work and stop replenishment of the chamber part 24 with the staining solution 11 when receiving no instruction to perform staining work on the glass slides 10, and to resume staining work and replenish the chamber part 24 with the staining solution 11 when receiving anew an instruction to perform staining work on the glass slides 10.

The controller 71 is configured to perform control such that when staining work on the glass slide 10 is paused and then resumed, the chamber part 24 is replenished with the staining solution 11 in an amount corresponding to the period of time of the pause. For example, if the pause time is N times a preset elapsed time, the controller 71 performs control such that the chamber part 24 is replenished with N times worth of the staining solution 11. This configuration enables proper replenishment with the staining solution 11 to compensate for an amount evaporated or deteriorated during the pause time. To be more specific, the controller 71 is configured to control the fluid mechanism 700 so that when staining work on the glass slide 10 is paused and then resumed, the chamber part 24 may be replenished with the staining solution 11 in an amount corresponding to the pause time counted by the clock part 713.

The controller 71 is configured to perform control such that the chamber part 24 is replenished with the staining solution 11 in up to an amount corresponding to the capacity of the chamber part 24. Specifically, the controller 71 is configured so that if the amount of replenishment with N times worth of staining solution 11 exceeds the capacity of the chamber part 24, the chamber part 24 is replenished with the staining solution 11 in an amount equal to the capacity of the chamber part 24. Such a configuration does not permit excessive replenishment with the staining solution 11, and is therefore effective in reducing wasteful consumption of the staining solution 11. In other words, the controller 71 is configured to compare a predetermined amount with the amount of the staining solution 11 with which to replenish the chamber part 24, stored in the memory part 712, and control the fluid mechanism 700 to replenish the chamber part 24 with the staining solution 11 in up to the predetermined amount.

The controller 71 is configured to perform control such that the chamber parts 24 are replenished with the staining solution 11 in an order from upstream to downstream. As illustrated in FIG. 13, the glass slide 10 is placed in the plurality of chamber parts 24 by being transported in the order of the staining chambers 20a, 20b, 20c, the cleaning chamber 40a, the staining chamber 20d, 20e, and the cleaning chamber 40b. For example, when double staining called May-Giemsa stain is to be performed, the staining solutions 11 include methanol, a May Grünwald solution, and a Giemsa solution. When double staining called Wright-Giemsa stain is to be performed, the staining solutions 11 include methanol, a Wright solution, and a Giemsa solution. When single staining called Wright stain is to be performed, the staining solutions 11 include methanol and a Wright solution. In other words, the controller 71 is configured to set the order of priority such that the staining chambers 20a, 20b, 20c, 20d, and 20e are prioritized in the order mentioned, and performs control such that the chamber part 24 in which the glass slide 10 is to be immersed first is replenished with the staining solution 11 first.

For the double staining called May-Giemsa stain, methanol is put in the staining chamber 20a, an undiluted May Grünwald solution is put in the staining chamber 20b, and a diluted staining solution of a May Grünwald solution is put in the staining chamber 20c. Further, a phosphate buffer is put in the cleaning chamber 40a, and a diluted staining solution of a Giemsa solution is put in the staining chambers 20d and 20e. Pure water is put in the cleaning chamber 40b. In such a case, for example, the methanol and the undiluted May Grünwald solution are categorized as the undiluted solution group, and the diluted staining solution of a May Grünwald solution and the diluted staining solution of a Giemsa solution are categorized as the diluted staining solution group. Note that the pure water and the phosphate buffer are used for cleaning purposes and are therefore replaced after every cleaning of the glass slide 10.

For the double staining called Wright-Giemsa stain, methanol is put in the staining chamber 20a, an undiluted Wright solution is put in the staining chamber 20b, and a diluted staining solution of a Wright solution is put in the staining chamber 20c. Further, a phosphate buffer is put in the cleaning chamber 40a, and a diluted staining solution of a Giemsa solution is put in the staining chambers 20d and 20e. Pure water is put in the cleaning chamber 40b. In such a case, for example, the methanol and the undiluted Wright solution are categorized as the undiluted solution group, and the diluted staining solution of a Wright solution and the diluted staining solution of a Giemsa solution are categorized as the diluted staining solution group. Note that the pure water and the phosphate buffer are used for cleaning purposes and are therefore replaced after every cleaning of the glass slide 10.

For the single staining called Wright stain, methanol is put in the staining chamber 20a, an undiluted Wright solution is put in the staining chamber 20b, and a diluted staining solution of a Wright solution is put in the staining chamber 20c. A diluted staining solution of a Wright solution is put in the staining chambers 20d and 20e, and pure water is put in the cleaning chamber 40b. In such a case, for example, the methanol and the undiluted Wright solution are categorized as the undiluted solution group, and the diluted staining solution of a Wright solution is categorized as the diluted staining solution group. Note that the pure water is used for cleaning purposes and is therefore replaced after every cleaning of the glass slide 10.

Figure 14:
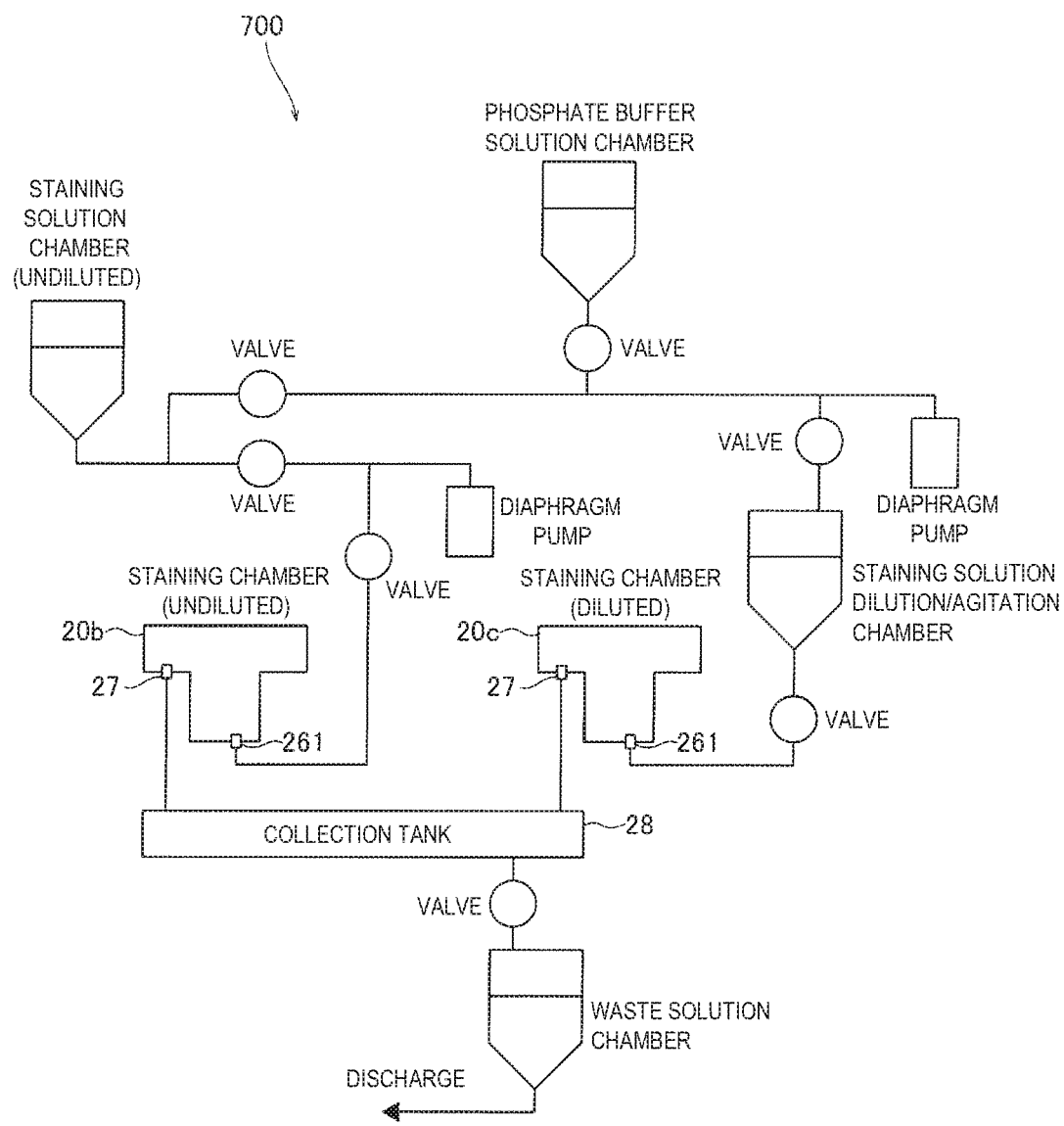
FIG. 14 is a schematic diagram illustrating part of a fluid circuit.

FIG. 14 illustrates part of the fluid mechanism 700 that supplies staining solutions to the chamber parts 24. The staining solution 11 is supplied to each staining chamber after being quantified using a diaphragm pump. For example, an undiluted staining solution 11 is supplied from a staining solution chamber to a staining chamber after being quantified using a diaphragm pump. Further, using a diaphragm pump, an undiluted staining solution 11 and a phosphate buffer solution are quantified and supplied to a staining solution dilution/agitation chamber, preparing a diluted staining solution as the staining solution 11. Then, the thus-prepared diluted staining solution as the staining solution 11 is supplied from the staining solution dilution/agitation chamber to a staining chamber after being quantified using a diaphragm pump. Although a diaphragm pump is used for the supply of a staining solution in an embodiment, the invention is not limited thereto. A staining solution may be supplied using a different type of pump, or using water pressure produced by difference in height.

The fluid mechanism 700 is configured to supply a staining solution to the chamber part 24 as controlled by the controller 71. Specifically, each diaphragm pump in the fluid mechanism 700 is driven as controlled by the controller 71. Moreover, opening and closing of each valve in the fluid mechanism 700 are controlled by the controller 71. The staining chambers may share a single diaphragm pump or be provided with their own diaphragm pumps.

The staining solution 11 is supplied to a staining chamber from the supply port 261 provided in a lower part of the staining chamber. Further, an excess of the staining solution 11 overflows from the discharge port 27 provided higher than or above the supply port 261, and is discharged to a waste solution chamber via the collection tank 28.

Figure 15:
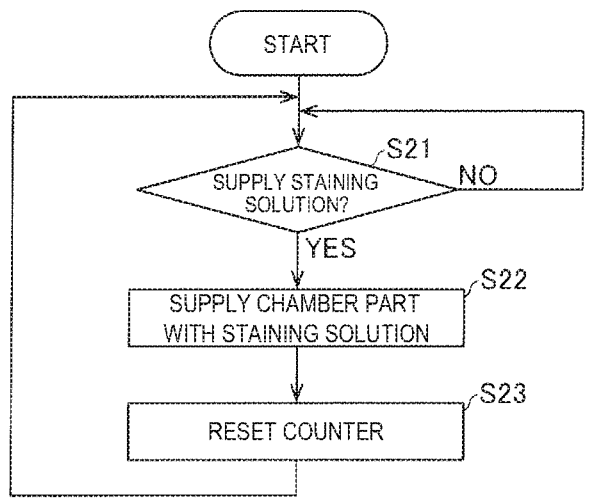
FIG. 15 is a flowchart illustrating staining solution supply processing.

With reference to FIG. 15, a description is given of staining solution supply processing performed in the staining unit 81 of the smear preparing apparatus 200. The controller 71 controls the smear preparing apparatus 200. Further, the staining solution supply processing is performed for each chamber part 24.

First, in Step S21 in FIG. 15, it is determined whether a condition for replenishment with the staining solution 11 is met. If the condition is met, the processing proceeds to Step S22, and if the condition is not met, the processing in Step S21 is repeated until the condition is met. The condition for replenishment with the staining solution 11 is, for example, when a predetermined period of time has elapsed since the last replenishment or when a predetermined number of glasses have been prepared since the last replenishment, in the mode in which the staining processing is performed.

In Step S22, the chamber part 24 is replenished with the staining solution 11. In Step S23, a counter for the condition for replenishment with the staining solution 11 is reset, and the processing proceeds back to Step S21. Note that the reset of the counter is reset of an elapsed time when the replenishment is a result of a lapse of a predetermined elapsed time, and is reset of the number of glasses prepared when the replenishment is a result of preparation of a predetermined number of glasses. This is how the staining solution supply processing is performed.

It should be noted that the embodiments disclosed herein should be interpreted as exemplary in every aspect and as nonrestrictive. The scope of the invention is defined not by the description of the above embodiments, but by the scope of claims, and includes every changes (modifications) made within the meaning and scope equivalent to the scope of claims.

The invention claimed is:

1. A smear staining apparatus comprising:
   a chamber part in which glass slides can be placed and that is configured to contain a staining solution for staining a smear on each of the glass slides;
   a cover part that covers the chamber part from above and comprises an insertion hole through which the glass slides are transported to the chamber part; and
   a transport part that transports the glass slides one at a time to the chamber part through the insertion hole, wherein,
   the transport part is configured with a structure to grip, take out, and transport only one glass slide at a time and to take the only one glass slide in and out through the insertion hole.

2. The smear staining apparatus according to claim 1, wherein
   the cover part comprises:
      a top plate that covers the chamber part from above; and
      a slide holder configured to hold the glass slides, and
   the slide holder that extends from the cover part toward a bottom portion of the chamber part and is configured to hold the glass slides immersed in the staining solution.

3. The smear staining apparatus according to claim 2, wherein
   the slide holder is configured to:
      hold the glass slides upright with a longitudinal direction of the glass slides being along a vertical direction; and
      hold the glass slides at respective holding positions arranged in a thickness direction of the glass slides,
   the chamber part comprises:
      a first portion in which the glass slides are held by the slide holder; and
      a second portion that is adjacent to the first portion in a width direction of the glass slides placed in the chamber part, wherein the staining solution can flow between the first portion and the second portion, and
   the top plate of the cover part covers the second portion of the chamber part from above.

4. The smear staining apparatus according to claim 3, wherein
   the first portion is deeper than the second portion, and in the width direction of the glass slides placed in the chamber part, an inside dimension of an upper part of the chamber part is larger than an inside dimension of a lower part of the chamber part.

5. The smear staining apparatus according to claim 3, wherein
   in the width direction of the glass slides placed in the chamber part, the second portion is placed adjacent to both sides of the first portion, and
   the top plate covers the second portion adjacent to both sides of the first portion.

6. The smear staining apparatus according to claim 3, wherein
   the top plate extends from an inner side surface of the chamber part toward the insertion hole in the width direction of the glass slides placed in the chamber part, and
   the cover part comprises an inner wall that extends from an end portion of the top plate on the insertion hole side, toward the bottom portion of the chamber part, to a position under a liquid surface of the staining solution.

7. The smear staining apparatus according to claim 6, wherein
   the cover part comprises a ventilation portion though which a gas in a space surrounded by the inner side surface of the chamber part, the top plate, the inner wall, and the liquid surface of the staining solution can go outside.

8. The smear staining apparatus according to claim 1, wherein
   the insertion hole comprises a plurality of insertion holes, and
   each of the plurality of the insertion holes is a slit through which one glass slide is insertable.

9. The smear staining apparatus according to claim 1, further comprising:
   a fluid mechanism that is configured to supply the chamber part with the staining solution; and
   a controller that causes the fluid mechanism to supply the chamber part with the staining solution in a condition in which at least one glass slide is placed in the chamber part.

10. The smear staining apparatus according to claim 9, wherein
    the controller is able to receive a setting of timing to supply the chamber part with the staining solution.

11. The smear staining apparatus according to claim 10, wherein
    the controller is able to receive, as the setting of the timing to supply the chamber part with the staining solution, a setting of at least one of: a time of day; and an elapsed time since a previous supply with the staining solution, and
    the controller comprises a clock part that counts time and causes the fluid mechanism to supply the chamber part with the staining solution based on at least one of: the time of day; and the elapsed time counted by the clock part since the previous supply with the staining solution.

12. The smear staining apparatus according to claim 10, wherein
    the controller is able to receive, as the setting of the timing to supply the chamber part with the staining solution, a setting of the number of the glass slides prepared since a previous supply with the staining solution, and
    the controller comprises a memory part that stores the number of the glass slides prepared and causes the fluid mechanism to supply the chamber part with the staining solution based on the stored number of the glass slides prepared since the previous supply with the staining solution.

13. The smear staining apparatus according to claim 9, wherein the controller causes the fluid mechanism to supply the chamber part with the staining solution when receiving an instruction to perform staining on the glass slides.

14. The smear staining apparatus according to claim 9, wherein when receiving no instruction to perform staining on the glass slides, the controller pauses staining and causes the fluid mechanism to stop supplying the chamber part with the staining solution, and when receiving anew an instruction to perform staining on the glass slides, the controller resumes staining and causes the fluid mechanism to supply the chamber part with the staining solution.

15. The smear staining apparatus according to claim 14, wherein the controller comprises a clock part that counts time, and in a condition in which staining on the glass slides is paused and then resumed, causes the fluid mechanism to supply the chamber part with the staining solution in an amount corresponding to a period of time of the pause counted by the clock part.

16. The smear staining apparatus according to claim 15, wherein the controller comprises a memory part that stores an amount of the staining solution with which to supply the chamber part, the controller compares a predetermined amount with the amount of the staining solution stored in the memory part, and the controller causes the fluid mechanism to supply the chamber part with the staining solution in up to the predetermined amount.

17. The smear staining apparatus according to claim 9, wherein the chamber part comprises a plurality of chamber parts in each of which the glass slides can be placed, and the controller causes the fluid mechanism to supply the chamber parts with the staining solution in an order from upstream to downstream.

18. A smear staining apparatus comprising:

a chamber part in which glass slides can be placed and that is configured to contain a staining solution for staining a smear on each of the glass slides;

a cover part that covers the chamber part from above and comprises an insertion hole through which the glass slides are transported one by one into and out of the chamber part;

a fluid mechanism that supplies the chamber part with the staining solution; and a controller that causes the fluid mechanism to supply the chamber part in which the glass slides are placed one by one, with the staining solution wherein the glass slides are transported by gripping, taking out, and transporting only one glass slide at a time and taking the only one glass slide in and out through the insertion hole.

19. A smear staining method comprising:

filling a chamber part in which glass slides can be placed with a staining solution for staining a smear on each of the glass slides; and supplying the chamber part in which the glass slides are placed one by one, with the staining solution, wherein the chamber part is covered from above by a cover part comprising an insertion hole through which the glass slides are transported one by one into and out of the chamber part, and the glass slides are transported by gripping, taking out, and transporting only one glass slide at a time and taking the only one glass slide in and out through the insertion hole.

* * * * *